US010062240B2

(12) United States Patent

Breslo et al.

(10) Patent No.: US 10,062,240 B2
(45) Date of Patent: Aug. 28, 2018

(54) PROGRESSIVE JACKPOT ASSOCIATED WITH DEALS OF PRE-PRINTED TICKETS DISPENSED AT MULTIPLE LOCATIONS BY CASHIERS

(71) Applicant: Diamond Game Enterprises, Chatsworth, CA (US)

(72) Inventors: James A. Breslo, Pacific Palisades, CA (US); William F. Breslo, Topanga, CA (US)

(73) Assignee: Diamond Game Enterprises, Chatsworth, CA (US)

( * ) Notice: Subject to any disclaimer, the term of this patent is extended or adjusted under 35 U.S.C. 154(b) by 47 days.

(21) Appl. No.: 15/218,846

(22) Filed: Jul. 25, 2016

(65) Prior Publication Data

US 2017/0053494 A1 Feb. 23, 2017

Related U.S. Application Data

(60) Provisional application No. 62/207,602, filed on Aug. 20, 2015.

(51) Int. Cl.

| | |
|---|---|
| ***G06F 17/00*** | (2006.01) |
| ***G07F 17/32*** | (2006.01) |
| ***G07F 17/42*** | (2006.01) |

(52) U.S. Cl.

CPC ........ *G07F 17/3258* (2013.01); *G07F 17/323* (2013.01); *G07F 17/3204* (2013.01); *G07F 17/329* (2013.01); *G07F 17/3211* (2013.01); *G07F 17/3225* (2013.01); *G07F 17/3272* (2013.01); *G07F 17/42* (2013.01)

(58) Field of Classification Search

None

See application file for complete search history.

(56) References Cited

U.S. PATENT DOCUMENTS

| | | | | |
|---|---|---|---|---|
| 6,554,710 | B1 * | 4/2003 | Olson | A63F 3/081 463/26 |
| 7,883,405 | B2 | 2/2011 | Robb | |
| 8,002,622 | B2 | 8/2011 | Breslo | |
| 8,197,325 | B2 * | 6/2012 | Wright | G07F 17/32 463/17 |
| 2002/0147047 | A1 * | 10/2002 | Letovsky | G07F 17/32 463/42 |
| 2006/0040722 | A1 * | 2/2006 | Manz | G07F 17/32 463/16 |

(Continued)

OTHER PUBLICATIONS

Office Action dated Feb. 16, 2018 in U.S. Appl. No. 15/218,854, by Breslo.

*Primary Examiner* — Paul A D'Agostino

(74) *Attorney, Agent, or Firm* — Panitch Schwarze Belisario & Nadel LLP

(57) ABSTRACT

Systems are provided for resetting and incrementing a progressive jackpot and its associated progressive jackpot display for a game defined by a plurality of tickets that are preprinted with game content and which are associated with a deal of tickets. The deal of tickets include at least some predetermined non-jackpot winning tickets, and at least some progressive jackpot tickets. The tickets are dispensed at a plurality of different remote locations. The progressive jackpot is the same progressive jackpot for each of the plurality of different remote locations.

17 Claims, 26 Drawing Sheets

(56) References Cited

U.S. PATENT DOCUMENTS

| | | | | |
|---|---|---|---|---|
| 2006/0052160 | A1* | 3/2006 | Saffari | G07F 17/32 463/27 |
| 2006/0079320 | A1* | 4/2006 | Erickson | G07F 17/32 463/25 |
| 2006/0111170 | A1* | 5/2006 | Hornik | G07F 17/32 463/16 |
| 2006/0211470 | A1* | 9/2006 | Walker | G07F 17/32 463/16 |
| 2009/0194988 | A1 | 8/2009 | Wright et al. | |
| 2009/0198662 | A1 | 8/2009 | Prabhakar et al. | |
| 2009/0224476 | A1* | 9/2009 | Grauzer | A63F 1/14 273/149 P |
| 2009/0227318 | A1 | 9/2009 | Wright et al. | |
| 2009/0270168 | A1* | 10/2009 | Englman | G07F 17/32 463/27 |
| 2010/0051708 | A1 | 3/2010 | Behm et al. | |
| 2010/0093419 | A1 | 4/2010 | Wright et al. | |
| 2010/0120497 | A1* | 5/2010 | Weber | G07F 17/32 463/20 |
| 2016/0026972 | A1* | 1/2016 | Bhalodwala | G06Q 10/087 705/28 |
| 2017/0004671 | A1 | 1/2017 | Connolly et al. | |

* cited by examiner

Figure 5
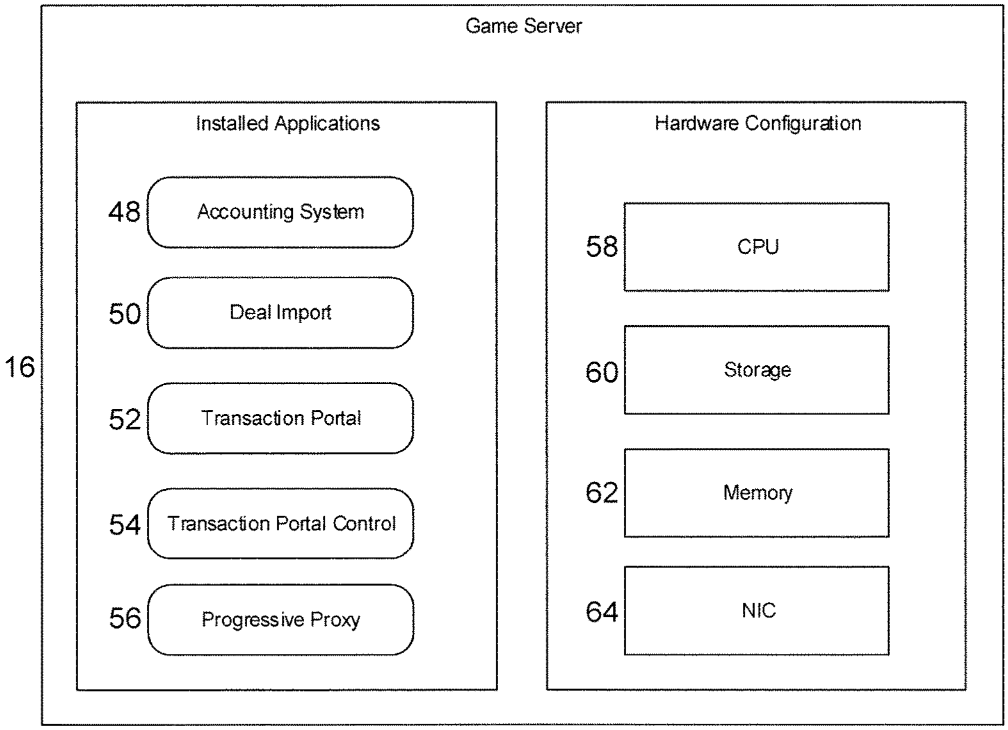
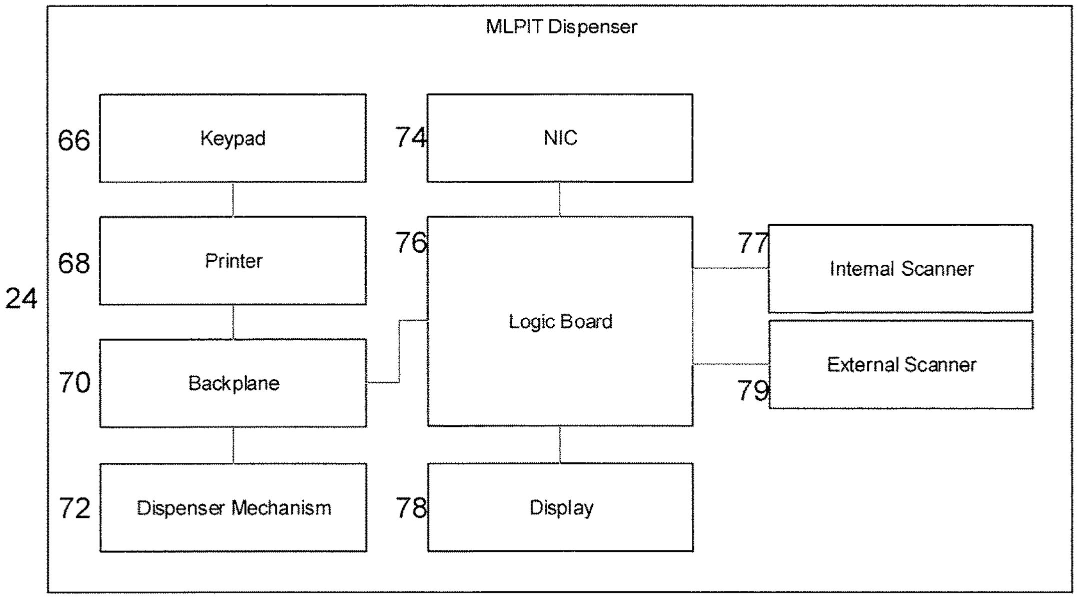

Figure 6A

Database Tables and Columns related to Multiple Location Progressive:

| Table Name | Column Name | Description |
|---|---|---|
| PROGRESSIVE_POOL | PROGRESSIVE_POOL_ID | Primary Key |
| | PROGRESSIVE_TYPE_ID | Link to PROGRESSIVE_TYPE table |
| | GAME_TYPE_CODE | Link to GAME_TYPE table |
| | DENOMINATION | Denomination in cents |
| | COINS_BET | Number of Coins bet |
| | LINES_BET | Number of Lines bet |
| | POOL_1 | Dollar amount of the Primary pool |
| | POOL_2 | Dollar amount of the first backup pool |
| | POOL_3 | Dollar amount of the second backup pool |
| PROGRESSIVE_TYPE | PROGRESSIVE_TYPE_ID | Primary Key |
| | RATE_1 | Contribution rate for Pool 1 |
| | RATE_2 | Contribution rate for Pool 2 |
| | RATE_2 | Contribution rate for Pool 3 |
| | RATE_COMBINED | Contribution Rate for all pools |
| | SEED_COUNT | Number of coins used to seed progressive pools |
| GAME_TYPE | GAME_TYPE_CODE | Primary Key |
| | PROGRESSIVE_TYPE_ID | Link to PROGRESSIVE_TYPE table |
| | TYPE_ID | Indicates type of Game (P)oker (S)lot or (K)eno |
| MACH_SETUP | MACH_NO | DGE Machine Number |
| | CASINO_MACH_NO | Casino Machine Number |
| | GAME_CODE | Identifies the Game being played |
| | BANK_NO | Link to BANK table, Bank Number to which the Machine is assigned |
| | ACTIVE_FLAG | Flag indicating if the Machine is active |
| | REMOVED_FLAG | Flag indicating if the Machine is removed |
| | LAST_ACTIVITY | Last Date and Time the Machine had activity |
| BANK | BANK_NO | Primary Key, identifying a Bank of Machines |
| | GAME_TYPE_CODE | Links this Bank to a GAME_TYPE record |
| POOL_EVENT | POOL_EVENT_ID | Primary Key |
| | POOL_EVENT_TYPE_ID | Link to the POOL_EVENT_TYPE table |
| | PROGRESSIVE_POOL_ID | Link to the PROGRESSIVE_POOL table |
| | POOL_NUMBER | Pool Number |
| | POOL_EVENT_DATE_TIME | Event date and time |
| | ACCT_DATE | Accounting Date |
| | AMOUNT | Event dollar amount |
| POOL_EVENT_TYPE | POOL_EVENT_TYPE_ID | Primary Key |

Figure 6B

| | | |
|---|---|---|
| | LONG_NAME | Event Description |
| PROGRESSIVE_CLAIMED | PROGRESSIVE_CLAIMED_ID | Primary Key |
| | POOL_EVENT_ID | Link to the POOL_EVENT table |
| | MACH_NO | Machine Identifier |
| | CASINO_MACH_NO | Casino assigned machine number |
| | CLAIMED_DATE | Date and Time progressive claimed at machine |
| | ACCT_DATE | Accounting Date |
| | PROGRESSIVE_POOL_ID | Link to Progressive Pool table |
| | AMOUNT_CLAIMED | Claimed amount in Dollars |
| | BANK_NO | Bank Number of the machine when claimed |
| | GAME_CODE | Game code of the machine when claimed |
| | DENOMINATION | Denomination of the play when claimed |
| | COINS_BET | Number of coins bet when claimed |
| | LINES_BET | Number of lines bet when claimed |

Game Ticket (front)

Game Ticket (rear)

Deal Database

| Ticket number | Ticket results (ticket results database) | Ticket purchased? | Ticket activation database (ticket scanned at ticket checker?) | Ticket redeemed? |
|---|---|---|---|---|
| | | | | |
| 1 | loser | Y | Y | |
| 2 | loser | Y | Y | |
| 3 | loser | Y | Y | |
| | :<br>: | | | |
| 1,005 | winner (non-jackpot fixed amount=$$) | Y | Y | Y |
| 1,006 | loser | Y | Y | |
| | :<br>: | | | |
| 6,009 | progressive jackpot winner | Y | N | N |
| | :<br>: | | | |
| 10,000 | loser | N | N | |

Figure 14

Ticket Checker / Activation Process

Game Type Option 1 - Lottery Pull-Tab (Theme: Dynamite Diamonds)

| Play Number | Play Result | Monetary Outcome |
|---|---|---|
| 1 | 5 x Pick Axe | $ 20.00 |
| 2 | 4 x Queen Symbol | $ 2.00 |
| 3 | 3 x Lantern Symbol | $ 1.00 |
| 4 | 3 x Aces Symbol | $ 1.00 |
| 5 | 2 x Wild1 Symbol | $ 1.00 |
| **Total** | | **$ 25.00** |

Figure 23A

Game Type Option 2 - Class II Bingo (Theme: Press It Up Poker)

| Play Number | Play Result | Monetary Outcome |
|---|---|---|
| 1 | Full House | $ 12.00 |
| 2 | Straight | $ 6.00 |
| 3 | Three 7s | $ 4.00 |
| 4 | Loss | $ - |
| 5 | Two Pair | $ 3.00 |
| **Total** | | **$ 25.00** |

Figure 23B

PROGRESSIVE JACKPOT ASSOCIATED WITH DEALS OF PRE-PRINTED TICKETS DISPENSED AT MULTIPLE LOCATIONS BY CASHIERS

CROSS REFERENCE TO RELATED APPLICATION

This application claims the benefit of U.S. Provisional Patent Application No. 62/207,602 filed Aug. 20, 2015, the entire disclosure of which is incorporated by reference herein.

This application is related to U.S. application Ser. No. 15/218,854 concurrently filed on Jul. 25, 2016 entitled "Ticket checker for activating winning pre-printed game tickets so as to permit redemption of the tickets."

BACKGROUND OF THE INVENTION

Preprinted game tickets, such as instant game lottery tickets or pull-tab tickets are known in the art. To create preprinted game tickets, a "deal" of game results is created using a computer program and the tickets are subsequently printed to match the deal, or a portion thereof. There are a fixed amount of predetermined wins in each deal. The type and amount of wins in the deal or deal portion are used to create the content of the tickets.

Instant game lottery tickets may be dispensed by clerks who manually retrieve the tickets from a stack, roll or pool of tickets. As is also known in the art, vending machines are sometimes used to dispense instant game lottery tickets directly to patrons. One example of a vending machine that dispenses preprinted game tickets, such as pull-tab tickets or lottery tickets, generated from a deal, is disclosed in U.S. Pat. No. 8,002,622 (Breslo), which is incorporated by reference herein. The deal typically includes one or more jackpot tickets. These jackpot tickets are not associated with a progressive jackpot since their jackpot value is predetermined when the deal of tickets is printed, and the jackpot value is preprinted on the ticket(s).

Draw game tickets, such as draw game lottery tickets are also known in the art. In a typical draw game lottery, tickets are sold by clerks (over-the-counter) via dispensing machines which are all connected to a central computer. The clerk then physically hands the tickets to the customers. The tickets may be purchased at a plurality of different physical locations. A set of numbers are selected at the time of purchase and are physically printed on the draw game ticket at the time of purchase via a printer in the dispensing machine. In some draw games, the customer may select the numbers or the customer may request that the clerk allow the central computer to randomly select the numbers. In other draw games, the central computer always selects the numbers. A "drawing" is then held to pick the set of winning numbers. The drawing is selected at periodic intervals, such as once per day, or once per event (e.g., Powerball® drawing).

In one prior art gaming system, a plurality of pull tab machines (Lucky Tab II machines, available from Diamond Game Enterprises, Inc., Chatsworth, Calif.) situated at a single physical location were joined together to form a progressive jackpot. A progressive jackpot display was publicly visible at the location so that players in the location could view the current status of the progressive jackpot. The deal of tickets included one or more jackpot tickets, the value of which was determined by the progressive jackpot, which would reset to a predetermined seed amount after each jackpot ticket was dispensed from a machine.

It would be desirable to provide a progressive jackpot gaming experience for use with preprinted instant game tickets, such as instant lottery tickets or pull-tab tickets, in the retail environment on a distributed basis (i.e., in a plurality of retail locations separated geographically). The present invention fulfills such a need by solving the technological hurdles inherent in the integration of preprinted game tickets with predetermined outcomes and a progressive jackpot that spans multiple locations.

There is a potential for clerk misconduct regarding misappropriation of winning jackpot tickets. If the clerk has just completed a ticket transaction for a player, but has not yet physically handed the purchased ticket to the player, and then becomes aware that the progressive jackpot was just reset, the clerk may set the ticket aside for him or herself or for a friend, and then give the player the next ticket in the batch. In this manner, the player is cheated out of a legitimately purchased winning jackpot ticket, without even having any idea that it has happened. Similar misconduct may occur if the clerk discovers that the ticket is a non-jackpot winning ticket for a fixed value before physically handing the purchased ticket to the player. It would be further desirable to provide measures to reduce the potential for clerk misconduct. The present invention fulfills such a need by enhancing the functionality of a conventional player-operated ticket checker.

SUMMARY OF THE PRESENT INVENTION

A ticket checker is provided for activating a player's previously purchased ticket that is preprinted with game content and which is associated with a deal of tickets that includes at least some winning tickets. A previously purchased winning ticket cannot be redeemed until it is activated. Machine readable indicia is scanned on the previously purchased ticket at a ticket checker that is in communication with a ticket results database. A ticket activation database electronically records that the winning ticket was scanned at the ticket checker, thereby activating the winning ticket. Redemption of the winning ticket includes electronically verifying in the ticket activation database that the winning ticket was scanned at the ticket checker.

BRIEF DESCRIPTION OF THE DRAWINGS

Preferred embodiments of the present invention will now be described by way of example with reference to the accompanying drawings:

FIGS. 2-5 show hardware/software components of the embodiment of FIG. 1.

FIGS. 6A, 6B and 7 show the databases table structure of the databases for the embodiment of FIG. 1.

FIG. 14 shows a deal database for use in the FIG. 11 embodiment.

FIGS. 23A and 23B show game play results for multi-theme games and multi-type games that are playable at a ticket activating self-service ticket checker in accordance with one preferred embodiment of the present invention.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

I. Clerk-Assisted Multiple Location (Multi-Location) Progressive Instant Ticket (MLPIT) Embodiment (Jackpot Resetting Upon Dispensing of Progressive Jackpot Winning Ticket)

Figure 1:
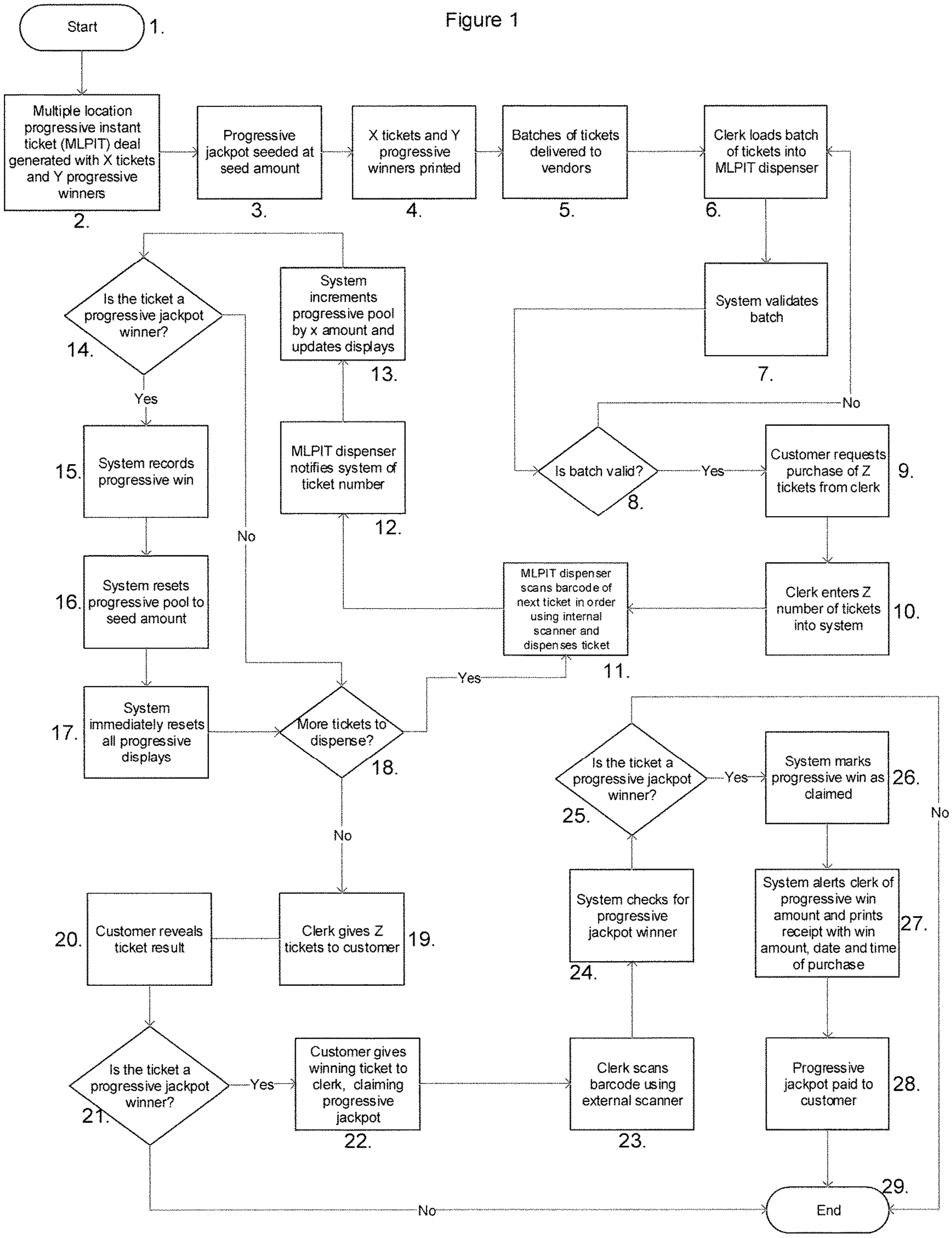
FIG. 1 shows a flowchart of one preferred embodiment of the present invention.

FIG. 1 shows a flowchart of this embodiment. This embodiment uses MLPIT dispensers. Since this is a multiple location progressive embodiment, there are MLPIT dispensers at a plurality of different physical locations. Each location may have one or more MLPIT dispensers. The steps of the process are described in the context of actions that occur at a single MLPIT dispenser, which is staffed by a clerk who interfaces with the customers (also, referred to herein interchangeably as "ticket purchasers" or "players"). The clerk operates the MLPIT dispenser.

A MLPIT deal is generated with "X" number of tickets and "Y" number of progressive winners. The progressive jackpot is seeded at the seed amount. "X" tickets and "Y" progressive winners are printed and then delivered to vendors, after which a clerk loads the batch of tickets into a MLPIT dispenser. The system validates the batch and determines whether or not the batch of tickets is good. (see steps 1-8)

If the batch of tickets is not validated as good, the clerk must go back to the previous step to load a new batch of tickets into the MLPIT dispenser. If the batch of tickets is validated as good, then the customer may purchase "Z" number of tickets by communicating the desired number of tickets to be purchased to the clerk and the clerk then enters "Z" number of tickets purchased into the system. The MLPIT dispenser then scans the barcode of the next ticket in order using the internal scanner and dispenses the ticket. The MLPIT dispenser notifies the system of the ticket number and the system increments the progressive pool by "x" amount and displays update results. (see steps 9-13)

If the ticket is a progressive jackpot winner, the system records the progressive win, resets the progressive pool to the seed amount, and resets all progressive displays. (see steps 14-17). There are a plurality of options for resetting the progressive displays.

Option 1: The progressive displays at each of the multiple locations are all simultaneously reset immediately after the progressive win is recorded.

Option 2: The progressive displays at each of the multiple locations are all simultaneously reset a short time after the progressive win is recorded.

Option 3: The progressive displays at each of the multiple locations, other than the location where the winning ticket was sold, are all simultaneously reset immediately after the progressive win is recorded, and the progressive display at the location where the winning ticket was sold is reset a short time after the progressive win is recorded. The short time period may range from multiple seconds to minutes after the progressive win is recorded. One advantage of the third option is that it inhibits clerk misconduct regarding misappropriation of winning jackpot tickets. If the clerk has just completed a ticket transaction for a player, but has not yet physically handed the purchased ticket to the player, and then becomes aware that the progressive jackpot was just reset, the clerk may set the ticket aside for him or herself or for a friend, and then give the player another ticket. In this manner, the player can be cheated out of a legitimately purchased winning jackpot ticket, without being aware that it has happened. To thwart this process, the short time period needs to be at least the time period necessary to complete a typical ticket purchase, plus a buffer for safety (e.g., multiple seconds to minutes). If there are very large number of clerk-assisted ticket purchasing locations and a sufficiently high volume of steady ticket sales throughout the day, the odds that a particular clerk would be able to cheat the system in this manner is reduced because a plurality of purchased tickets may be in the process of being physically handed the purchased ticket to the player when a jackpot is reset. However, the overall integrity of the system may still be enhanced by this third option for resetting the progressive displays.

Figure 8A:
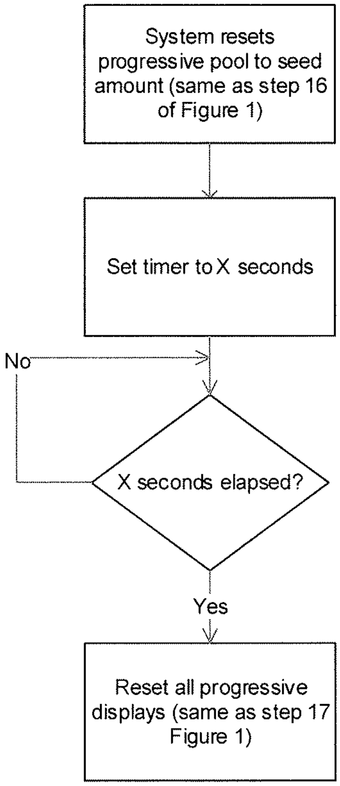
FIGS. 8A and 8B show flowcharts for progressive display resetting processes in accordance with preferred embodiments of the present invention.
Figure 8B:
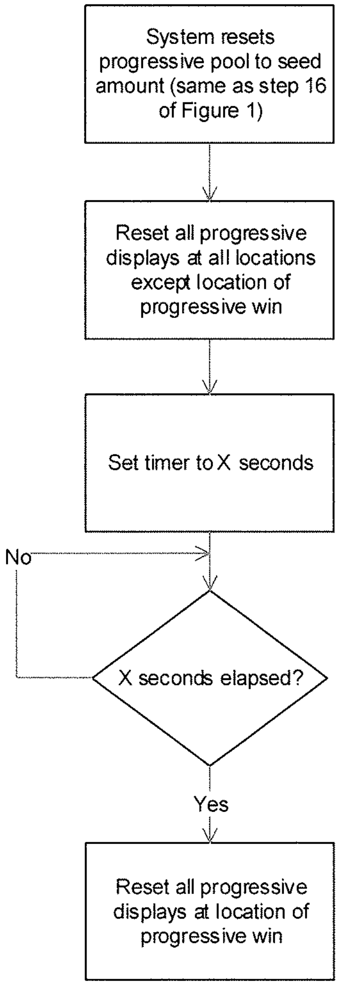

The above-described second and third options of the progressive display resetting process are illustrated in the flowcharts of FIGS. 8A and 8B, respectively. The steps in the respective flowcharts would substitute for steps 16 and 17 of FIG. 1.

If the ticket is not a progressive jackpot winner and the customer continues to make purchases, the aforementioned cycle of MLPIT dispenser barcode scanning and ticket dispensing continues. When all of the purchased tickets have been dispensed, regardless of whether the last ticket was or was not a progressive jackpot winner, the clerk will give "Z" tickets to the customer and the customer will reveal the result (e.g., opening a pull-tab or removing the cover layer on a scratch-off ticket). If the ticket is not a progressive win, then play has ended, at least with respect to the progressive jackpot steps. (see steps 18-21) Since there are other non-jackpot-type winning tickets in a deal, the player may still potentially reveal a winning ticket of a preprinted fixed amount. If the ticket is a winner, but not a jackpot winner, the player may return it to the clerk for redemption.

If the ticket is a progressive winner, then the customer will give the winning ticket to the clerk to claim the progressive jackpot. The clerk then scans the barcode using an external scanner and the system will determine whether the ticket is a progressive jackpot winner. If the system determines that the ticket is not a progressive jackpot winner, play has ended, at least with respect to the progressive jackpot steps. If the system determines that the ticket is a progressive jackpot winner, the system will mark the progressive win as "claimed". The system will then alert the clerk to the progressive jackpot amount that existed when the ticket was purchased (not the current jackpot amount) and print a receipt with the jackpot amount, date, and time of purchase. The progressive jackpot is then paid to the customer. (see steps 22-29) (The terms "claim" and "redeem" are used herein interchangeably.)

The game tickets may be any type of preprinted ticket, such as the tickets shown in FIG. 1 of U.S. Pat. No. 8,002,622, coded tickets (i.e., tickets with an optical machine-readable representation of data relating to the ticket or a sequence of exposed alphanumeric characters which represents data relating to the ticket), scratch-off tickets, peel-open tickets, break-open tickets or tickets with physical pull-tabs.

FIGS. 2-5 show hardware/software components of the embodiment of FIG. 1.

Figure 2:
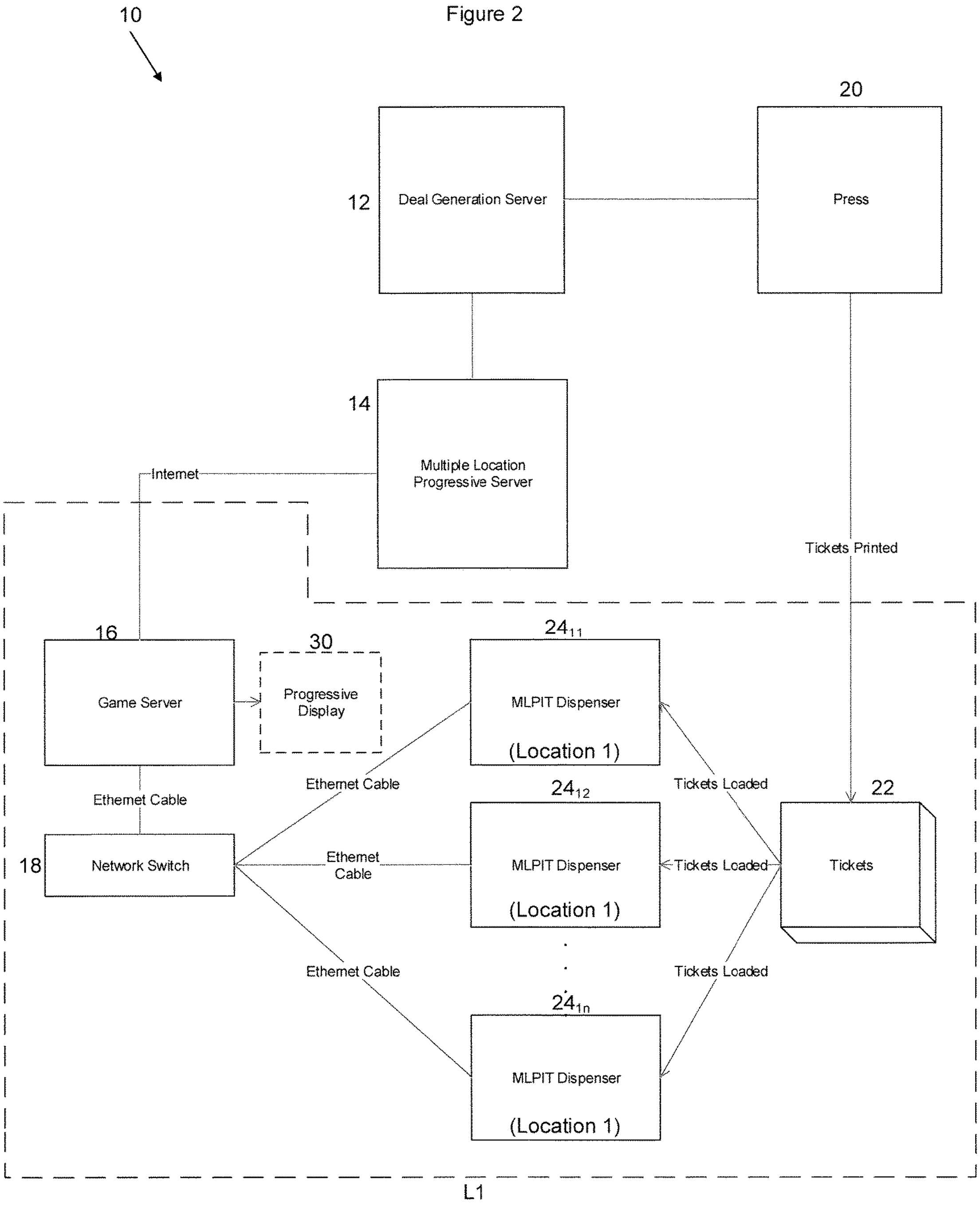
Figure 3:
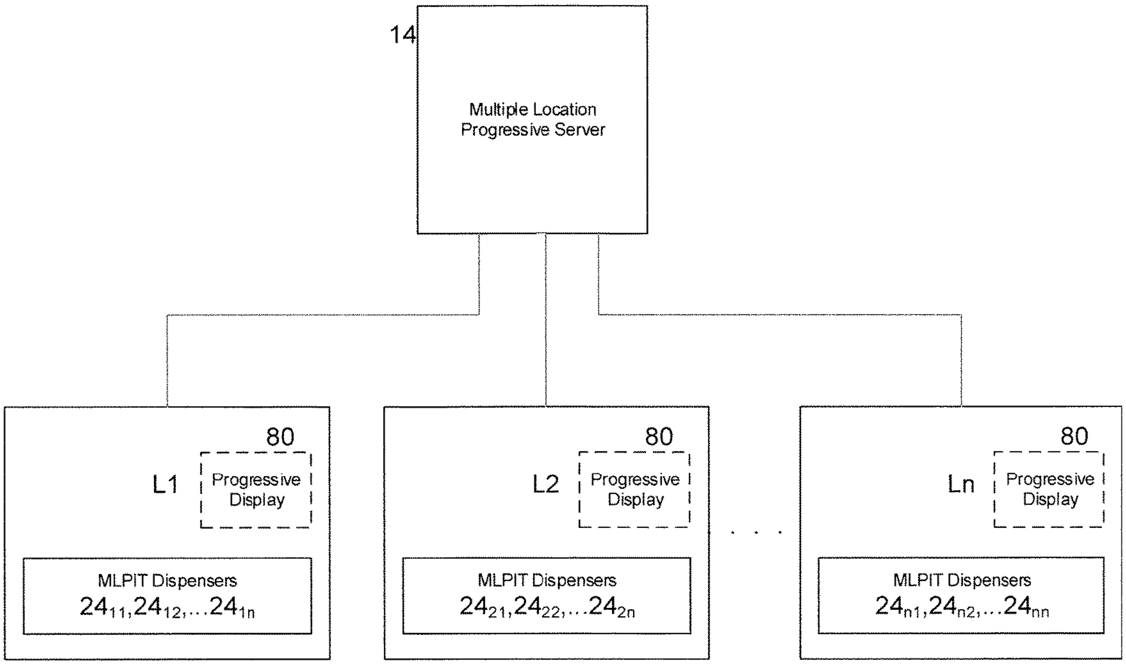

FIGS. 2 and 3 show an overall system configuration 10, which includes a data generation server 12, multiple location progressive (WAP) server 14, game server 16, network switch 18, press (printer) 20, tickets 22, and MLPIT dispensers $\mathbf{24}_{11}$, $\mathbf{24}_{12}$, . . . $\mathbf{24}_{1n}$, each of which are located at the same physical location 1. Each of the MLPIT dispensers $\mathbf{24}_{11}$, $\mathbf{24}_{12}$, . . . $\mathbf{24}_{1n}$ are connected via Ethernet cables to the game server 16 via the network switch 18, which, in turn is connected via an electronic network (e.g., the internet) to the multiple location progressive server 14. The elements within the dashed lines, represented by L1, are all located at the same physical location. In alternative embodiments, one or more of these elements may be located remotely from each other and would communicate with each other via an electronic network or the like.

Because this is a multiple location progressive embodiment, additional sets of elements within the dashed lines are located at one or more other physical locations L1, L2, Ln, as schematically depicted in FIG. 3. That is, location L1 includes MLPIT Dispensers $\mathbf{24}_{11}$, $\mathbf{24}_{12}$, . . . $\mathbf{24}_{1n}$, location L2 includes MLPIT Dispensers $\mathbf{24}_{21}$, $\mathbf{24}_{22}$, . . . $\mathbf{24}_{2n}$ and location Ln includes MLPIT Dispensers $\mathbf{24}_{n1}$, $\mathbf{24}_{n2}$, . . . $\mathbf{24}_{nn}$. Each location is connected to the multiple location progressive server 14 via the Internet. (The game servers 16 and network switches 18 at the respective locations are not shown in FIG. 3.) Since there are multiple locations, a progressive display 80 is provided at each location, preferably in a publicly accessible location. Alternatively, or in addition to a publicly accessible progressive display 80, a progressive display 80 may be part of the display 78 of each MLPIT dispenser shown in FIG. 5. In one alternative embodiment, there may be no progressive display 80 at one or more of the locations.

Figure 4:
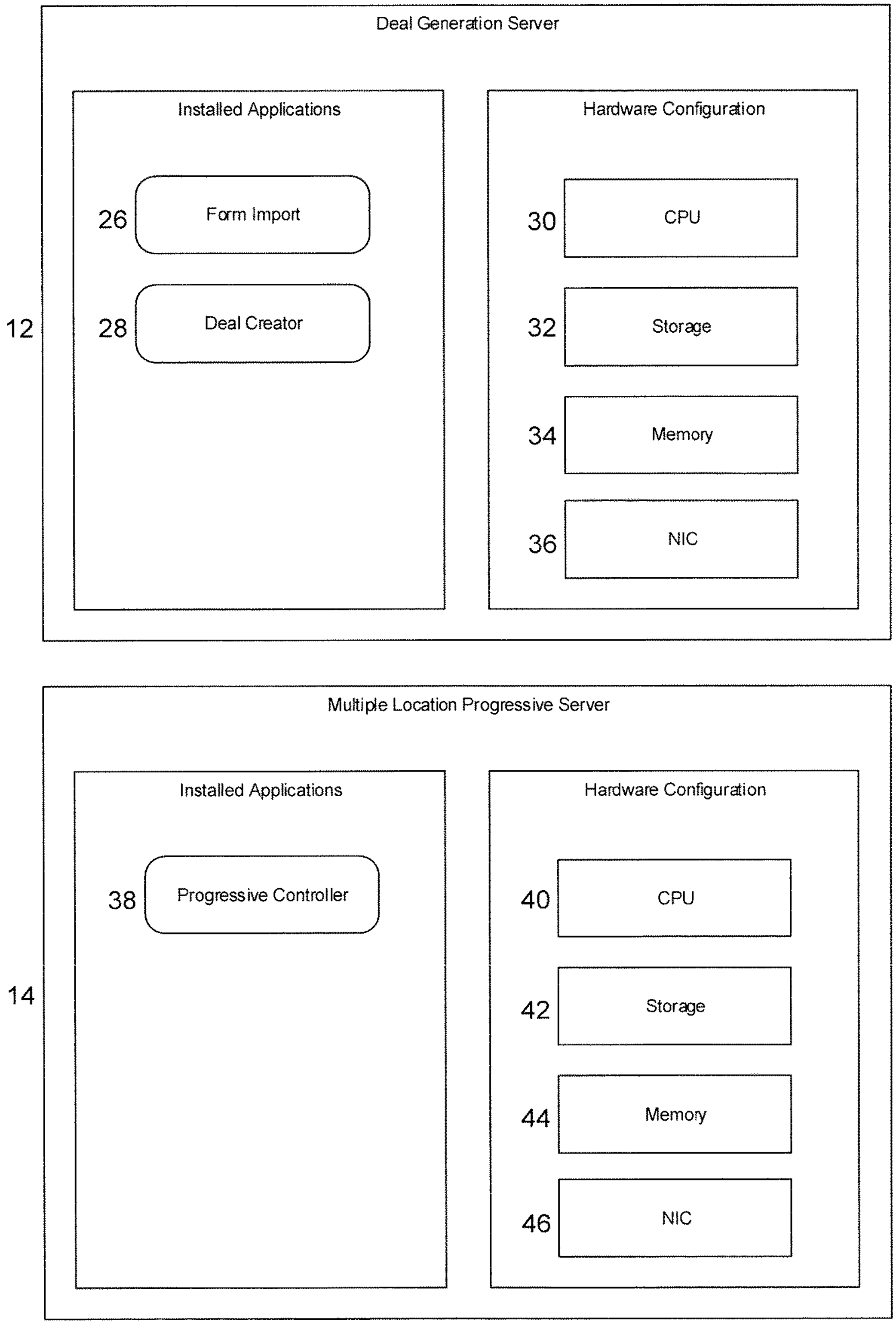

FIG. 4 shows installed applications and the hardware configuration of the deal generation server 12 and the multiple location progressive server 14. The installed applications of the deal generation server 12 include a form import 26 where all of the game deal criteria are entered, and deal creator 28. The hardware configuration of the deal generation server 12 includes CPU 30, storage 32, memory 34 and network interface controller (NIC) 36. The memory 34 is primary data storage that is directly accessible by the CPU 30 (e.g., RAM), whereas storage 32 is secondary data storage that is not directly accessible by the CPU 30 (e.g., hard disk drive). The multiple location progressive server 14 includes an installed application for a progressive controller 38 and a hardware configuration that includes similar elements as the data generation server 12, namely, CPU 40, storage 42, memory 44 and network interface controller (NIC) 46.

FIG. 5 shows installed applications and the hardware configuration of the game server 16 and each of the MLPIT dispensers 24. The installed applications of the game server 16 include an accounting system 48, deal import 50, transaction portal 52, transaction portal control 54 and progressive proxy 56. The "progressive proxy 56" is a firewall. The hardware configuration of the game server 16 includes similar elements as the data generation server 12, namely, CPU 58, storage 60, memory 62 and network interface controller (NIC) 64. Each MLPIT dispenser 24 includes a keypad 66, printer 68, backplane 70, dispenser mechanism 72, network interface controller (NIC) 74, logic board 76, display 78 and internal scanner 77.

As discussed above, the clerk operates the MLPIT dispenser 24. To facilitate ticket scanning, when a customer gives a presumed winning ticket to the clerk to claim the progressive jackpot, the clerk scans the barcode of the ticket using external scanner 79 and the system will determine whether the ticket is a progressive jackpot winner. There is an external scanner 79 in proximity to each MLPIT dispenser 24. The external scanner 79 is preferably connected to the logic board 76 of the MLPIT dispenser 24 as shown in FIG. 4, which, in turn, is in communication with the multiple location progressive server 14 as shown in FIG. 3. Alternatively, the external scanner 79 may be directly connected to a dedicated clerk terminal (not shown) separate from the MLPIT dispenser 24 which is in communication with the multiple location progressive server 14 shown in FIG. 3.

If the ticket is a winner, but is not a jackpot winner, the customer and clerk follow a similar process, except that the progressive jackpot is not reset.

Figure 7:
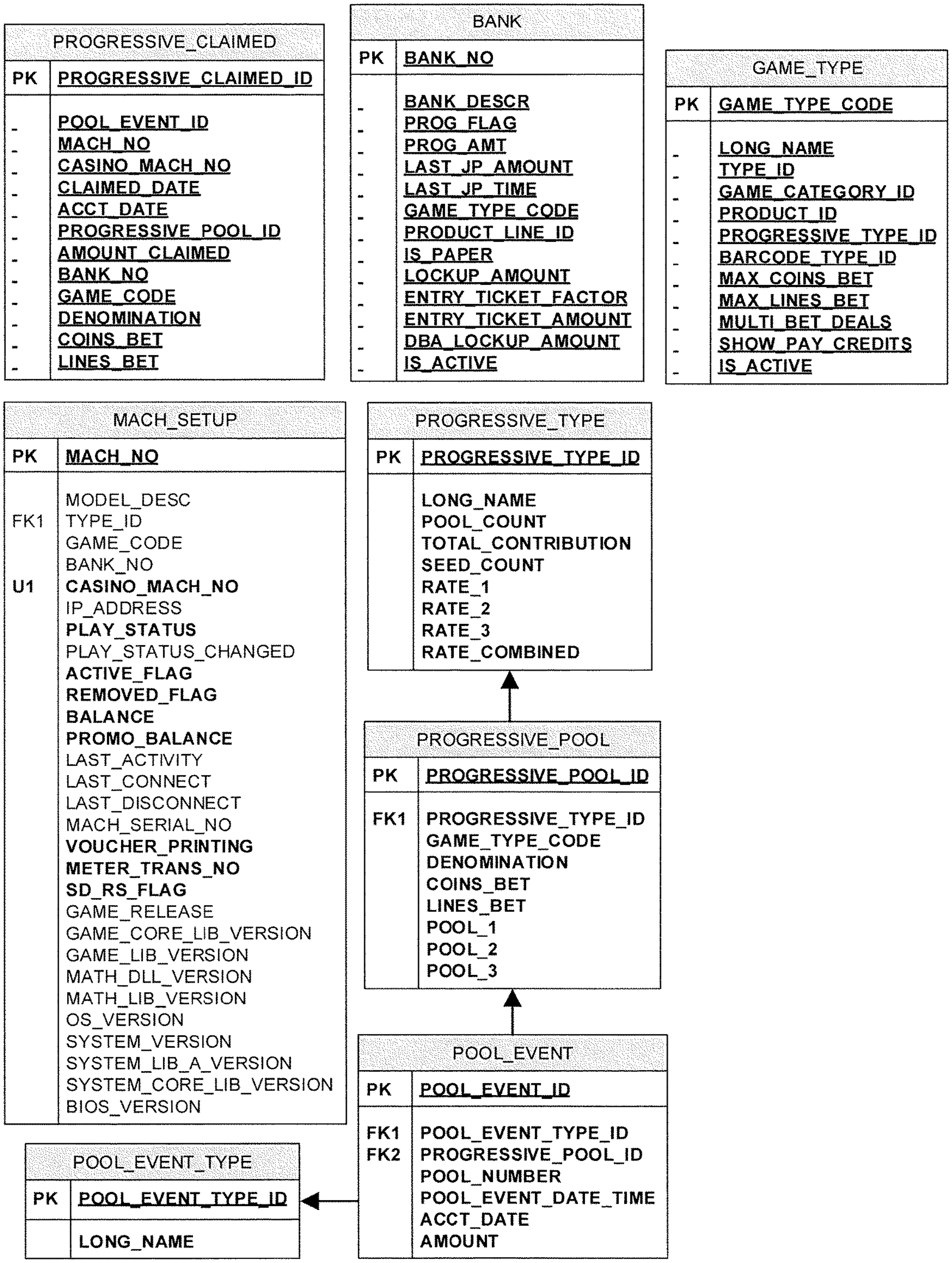

FIGS. 6A, 6B and 7 show the databases table structure of the databases for the clerk-assisted MLPIT embodiment. These figures are self-explanatory and thus are not further described.

II. Alternative Version of Multi-Location Clerk-Assisted Embodiment (Jackpot Resetting Upon Customer Redemption of Progressive Jackpot Winning Ticket)

In an alternative version of the embodiment described above, steps 14-17 of FIG. 1 which reset the jackpot do not occur upon ticket dispensing. Instead, these steps 14-17 occur only after a customer gives a winning ticket to a clerk (step 22) and the system confirms in steps 23-25 that the ticket is a progressive jackpot winner. The jackpot then resets to the seed amount. The jackpot that is awarded will be whatever amount was in the jackpot after step 25 is completed.

In this alternative version, the customer will not necessarily receive the same jackpot as in the first-described embodiment because the jackpot can increase between the time that the jackpot-winning ticket was dispensed and redeemed as more patrons may purchase tickets. In some instances, this time lag may benefit the customer if no other jackpot winner has redeemed a ticket in this time window because the jackpot will continue to grow during this period. In other instances, the time lag between the purchase of a progressive jackpot winning ticket and redemption of that progressive jackpot winning ticket may hurt the customer if another progressive jackpot winner has redeemed a progressive jackpot winning ticket in this time window, thereby reducing the progressive jackpot available for redemption by the first ticket buyer. The other progressive jackpot winner may have even received his or her progressive jackpot winning ticket at a later point in time, but was quicker in redeeming it.

In this alternative version, a predetermined time period (e.g., 90 days) is preferably designated for redemption of a progressive jackpot winning ticket, so that a customer cannot intentionally and repeatedly delay redeeming such a ticket until the progressive jackpot is more favorable. If the predetermined time period is exceeded, then the progressive jackpot winning ticket becomes null and void. This alternative version would require full disclosure to the customers so that they are aware of the risks, rewards, and severe penalties for delaying redemption of a progressive jackpot winning ticket.

To summarize, there are two different potential jackpot amount resetting embodiments, one wherein resetting of the progressive jackpot amount occurs immediately upon dispensing of a progressive jackpot winning ticket and another wherein resetting of the progressive jackpot amount occurs upon customer redemption of a progressive jackpot winning ticket.

III. Alternative Version of Multi-Location Clerk-Assisted Embodiment (Jackpot is Incremented by Winning Tickets and Jackpot is Reset Upon Customer Redemption of Progressive Jackpot Winning Ticket)

This alternative version differs from versions I and II described above in that the progressive jackpot is incremented when a winning (non-jackpot) ticket is claimed, not necessarily when a ticket (winner or loser) is dispensed. Upon claiming a winning ticket, the progressive jackpot is incremented by a portion of the value of the winning ticket. Since not all tickets are winners, the portion of the value allocated to the progressive jackpot for winning tickets is preferably set to a sufficiently high value so that the progressive jackpot grows in a similar manner as if a portion of every ticket (winner or loser) was allocated for the progressive jackpot.

In this alternative version, the progressive jackpot is claimed and reset in the same manner as described in version II, with the same considerations for the holder of a winning jackpot ticket.

Figure 9A:
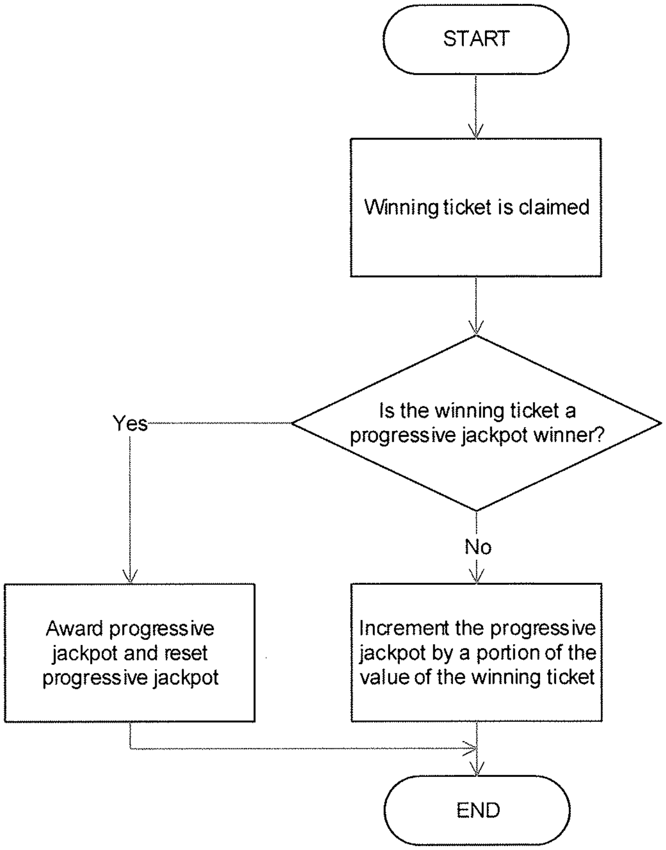
FIG. 9A shows a flowchart for an alternative embodiment of the present invention.

FIG. 9A shows a flowchart of the steps that occur with respect to the progressive jackpot when a winning ticket is claimed in this alternative version. If the winning ticket is a progressive jackpot winner, the progressive jackpot at that instance of time is awarded and is then reset to its starting value (e.g., base value). If the winning ticket is not a progressive jackpot winner, the progressive jackpot is incremented by a portion of the value of the winning ticket, which may be a percentage of the value of the winning ticket, or a fixed amount of the winning ticket.

In this alternative version, unclaimed winning (non-jackpot) tickets will reduce the amount of funds that would have been contributed to the progressive jackpot.

In this alternative version, the progressive jackpot is reset to a starting value (e.g., base value) or to a starting value, plus a percentage or fixed amount of the value of the jackpot that was just awarded. The percentage or fixed amount may be the same percentage or fixed amount that is used for incrementing the progressive jackpot when a winning (non-jackpot) ticket is claimed.

In this alternative version, the progressive jackpot is preferably incremented only by a portion of the value of a winning ticket. However, in a modified version of this alternative embodiment, the progressive jackpot is incremented by a portion of the value of a winning ticket, as well as by a portion of the value of a dispensed ticket (whether it is a winner or a loser), as is well-known in the art.

One physical implementation of this alternative version is the same as FIG. 3, wherein there are a plurality of MLPIT dispensers at a plurality of locations, except that the ticket dispensing activity does not necessarily result in the progressive jackpot being incremented.

Figure 9B:
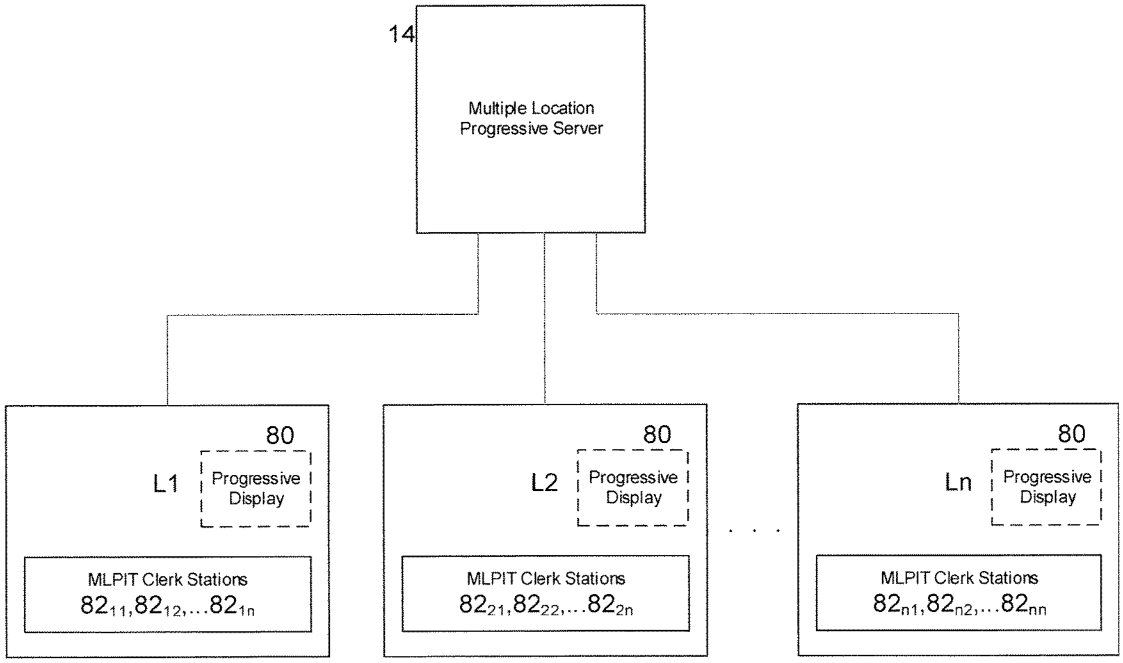
FIG. 9B shows a schematic diagram of the embodiment in FIG. 9A.

FIG. 9B shows another physical implementation of this alternative version. In this implementation there are no MLPIT dispensers. Instead, each location includes one or more clerk stations 82 staffed by clerks who dispense the tickets by manually retrieving the tickets from a stack, roll or pool of tickets. Whenever a clerk dispenses a ticket from the stack, roll or pool of tickets, ticket identifying information may optionally be electronically communicated to the Multiple Location Progressive Server 14. For example, a bar code or the like on an external surface of the ticket may be scanned by the clerk using the external scanner 79 as part of the dispensing process.

IV. Hardware/Software for Embodiments I-III

Figure 10:
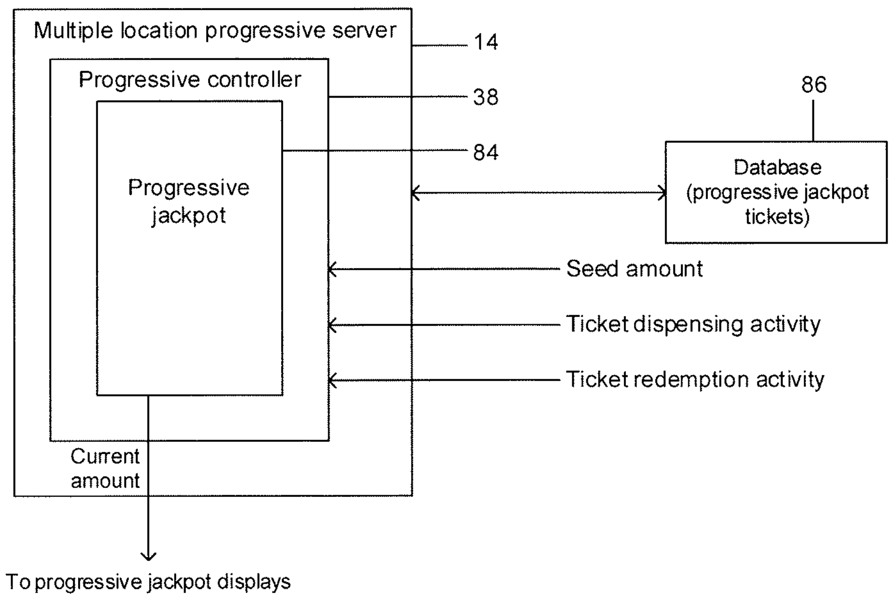
FIG. 10 shows an additional view of the hardware/software components in accordance with preferred embodiments of the present invention.

FIG. 10 shows an additional view of the hardware/software components in accordance with preferred embodiments of the present invention. The multiple location progressive server 14 includes the progressive controller 38, as also depicted in FIG. 4. The progressive controller 38 receives the seed amount, ticket dispensing activity and ticket redemption activity. This data is used to maintain the progressive jackpot. The progressive controller 38 includes progressive jackpot 84. The current amount of the progressive jackpot 84 is sent to the progressive jackpot displays 80 at the multiple locations shown in FIGS. 3 and 9B. Database 86 is in communication with the server 14 and maintains records regarding the tickets in the deal, including the progressive jackpot ticket(s). Fields in the database may include an identification of progressive jackpot winners, winner amount, dispensed status (Y or N), redeemed status (Y or N), dispensing location (this information is used in the optional feature of delaying resetting of the progressive jackpot display), time of dispensing, and time of redeeming. As discussed above with respect to FIGS. 2 and 3, in one alternative embodiment, there may be no progressive display 80 at one or more of the locations.

V. Ticket Activation Via Self-Service Ticket Checker

As discussed above, instant game lottery tickets may be dispensed by clerks who manually retrieve the tickets from a stack, roll or pool of tickets. As also discussed above, there is a potential for clerk misconduct regarding misappropriation of winning jackpot tickets. If the clerk has just completed a ticket transaction for a player, but has not yet physically handed the purchased ticket to the player, and then becomes aware that the progressive jackpot was just reset, the clerk may set the ticket aside for him or herself or for a friend, and then give the player the next ticket in the batch. In this manner, the player is cheated out of a legitimately purchased winning jackpot ticket, without even having any idea that it has happened. Similar misconduct may occur if the clerk discovers that the ticket is a non-jackpot winning ticket for a fixed value before physically handing the purchased ticket to the player. As discussed above, to inhibit clerk misconduct regarding progressive jackpot tickets, the progressive display at the location where the winning ticket was sold may be reset a short time after the progressive win is recorded. However, additional measures may be desirable to further reduce the potential for clerk misconduct. FIGS. 11-16 disclose an alternative embodiment for doing so.

Figure 11:
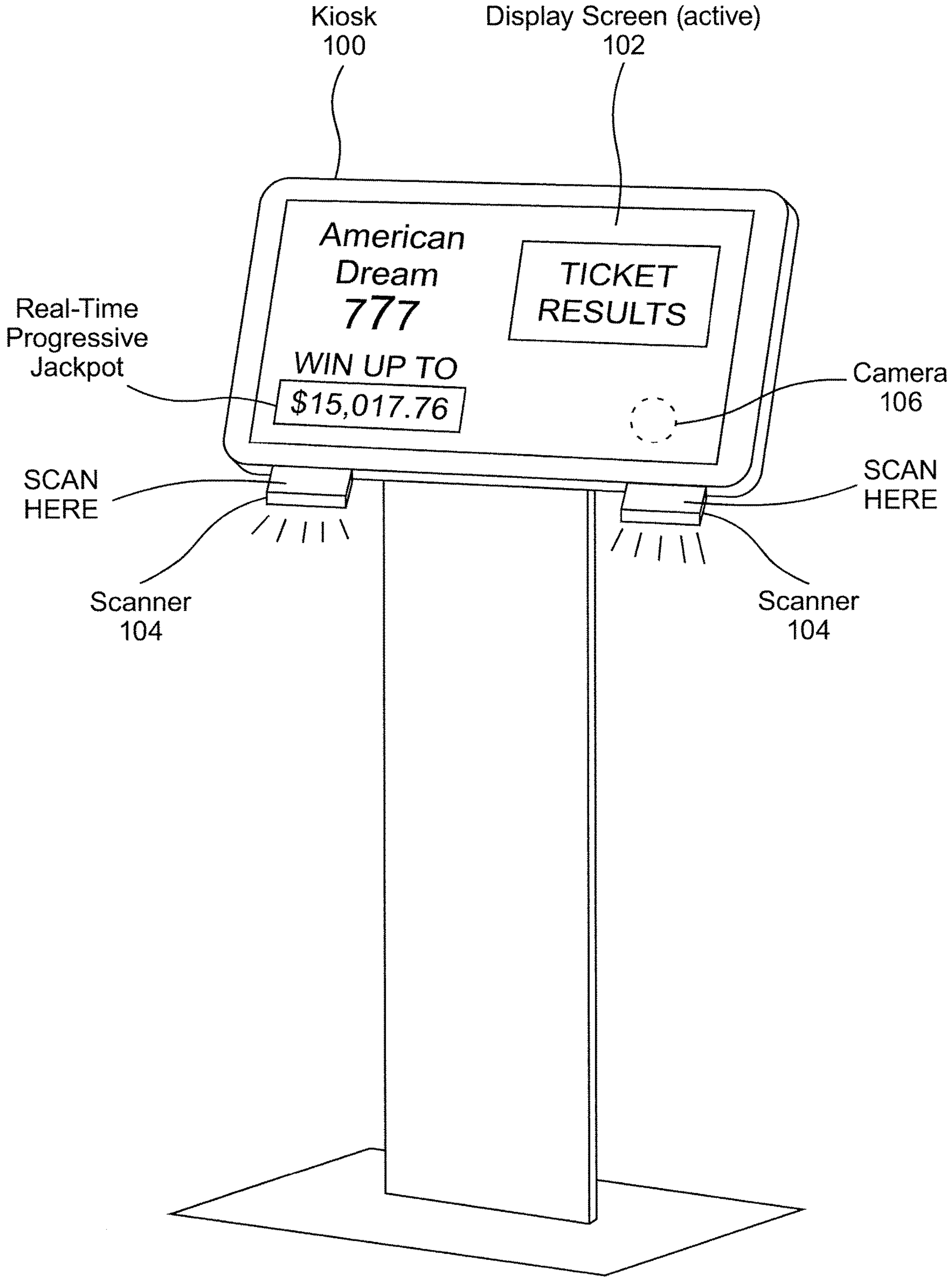
FIG. 11 shows a kiosk for use with a ticket activation feature in accordance with another preferred embodiment of the present invention.
Figure 12:
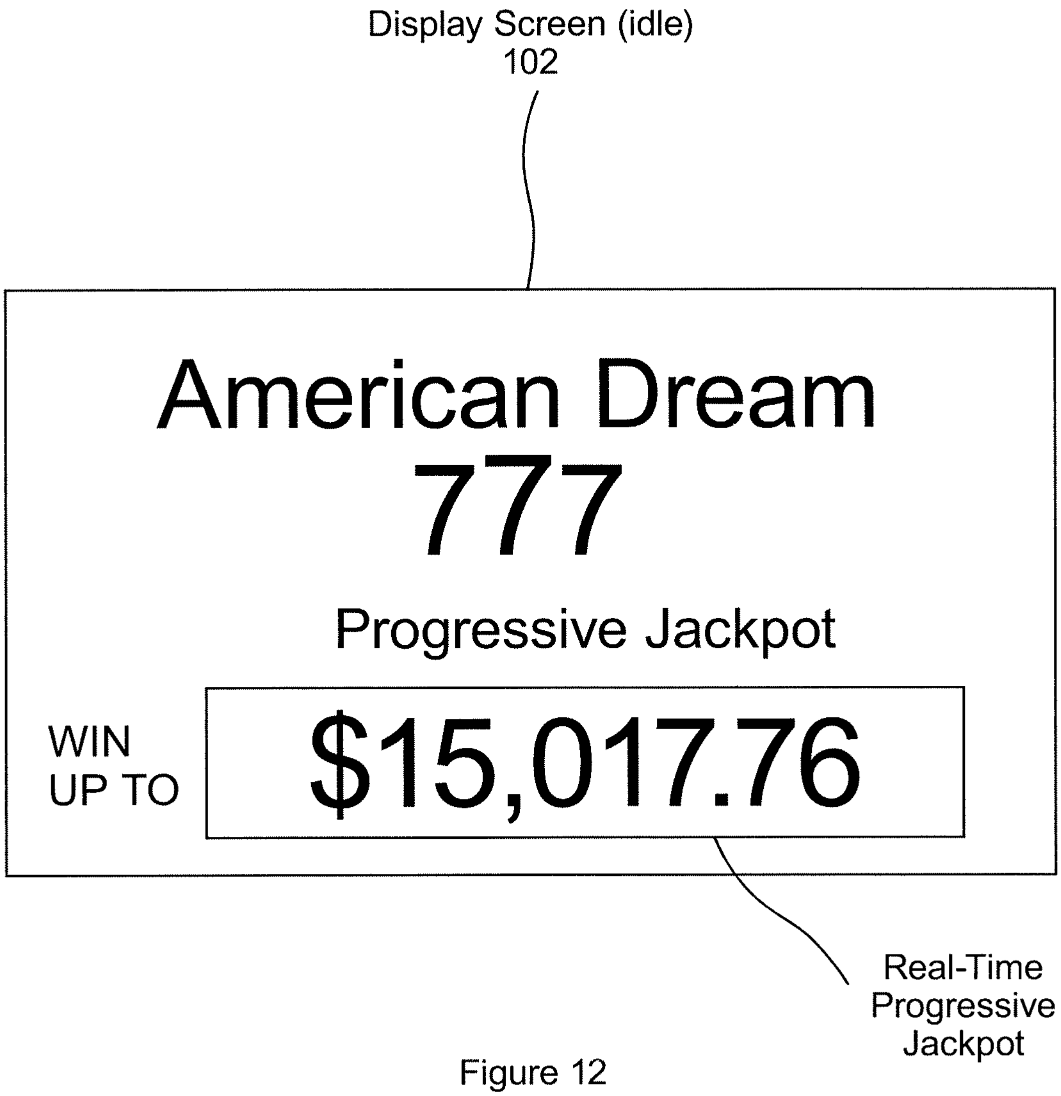
FIG. 12 shows an idle display screen of the kiosk in FIG. 11.

FIG. 11 shows a self-service player kiosk 100 (also, interchangeably referred to herein as a "ticket checker") for use with a ticket activation feature. The kiosk 100 includes a display screen 102 and one or more scanners 104. Each scanner is printed with indicia that reads "SCAN HERE" or the like. FIG. 12 shows an enlarged view of the display screen 102 when the kiosk 100 is in idle mode, whereas FIG. 11 shows the display screen 102 in an active mode after a player has scanned a ticket and is viewing the ticket results.

The kiosk 100 may optionally include a camera 106 for capturing images of the players who scan the tickets, wherein images of players who scan a winning ticket, and especially, a high value winning progressive jackpot ticket, are stored and used for fraud prevention auditing, if necessary.

Figure 13A:
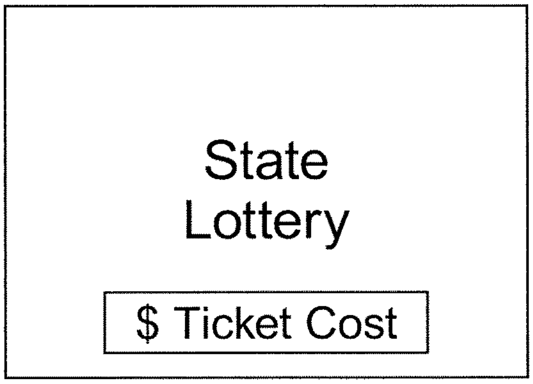
FIGS. 13A-13B show the front and back of a pull-tab lottery ticket for use in the FIG. 11 embodiment.
Figure 13B:
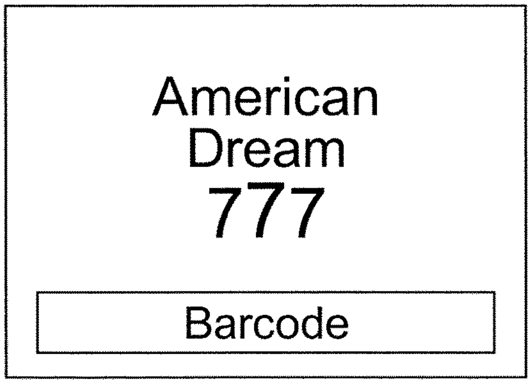

FIG. 13A and FIG. 13B show the front and rear sides of a sample game ticket, such as a lottery pull-tab ticket for a $10.00 progressive ticket. The rear side includes a bar code that is used for scanning and redemption. If the game ticket results are preprinted on the ticket, they are revealed by removing a cover layer if the ticket is a scratch-off ticket, or by opening a panel (window) if the ticket is a two-ply pull-tab ticket, or by other known methods depending upon the type of ticket. These features are conventional and are not illustrated in the figures. However, as discussed below, the game results may also be revealed using a player kiosk.

A sample description for a lottery game that incorporates the player kiosk is as follows, although this embodiment is not limited to any particular type of instant lottery ticket:

1. Player buys a pre-printed, two-ply $10 pull-tab ticket from the clerk
   i. Ticket has ten $1 plays
   ii. Game symbols (indicia) for all ten plays are printed inside the ticket
2. Player scans the barcode on the ticket at the ticket checker
   i. Video display shows an image of the ticket
   ii. Player touches the screen to reveal, one at a time, the ten plays on the ticket
   iii. Game results are shown in an entertaining way, with animations and sound
   iv. Prizes accumulate and the number of plays left are displayed
3. Progressive jackpot is displayed on the monitor
   i. Jackpot increments as each play is revealed
   ii. Celebration animation occurs when a jackpot is hit
   iii. Jackpot resets when it is hit, and increments up again upon each play (that is, the jackpot resets during the ticket checking process, not upon purchase of the ticket)
4. Player takes winning ticket to the clerk for payment (with knowledge that the ticket is a winner)
   i. Clerk scans the ticket
   ii. The win amount matches the accumulated win amount revealed on the checker While the above-described ticket has ten plays, the ticket may have any number of plays, including a single play.

5. Security and accountability
   i. Secure ticket validation & fraud prevention
   ii. Tickets activated only upon scanning by the player
   iii. Tickets cannot be cashed without first being activated at the kiosk
   iv. Central accounting system tracks all tickets activated and cashed, and the progressive jackpot.

In certain states, the ticket checker is not a gaming device or a slot machine as defined by state statute because no cash or other consideration is inserted into the ticket checker and the ticket checker does not apply the element of chance or deliver a prize. Presently, many state lotteries provide ticket checker machines which allow a player to check whether a lottery ticket is a winning ticket. These types of ticket checker machines typically read a bar code on the ticket and provide a display that indicates whether the ticket is a winner. However, other than looking up the result of the scanned ticket, no action is taken as a result of the scanning (e.g., verifying that the ticket was validly purchased, activating the ticket so it can be redeemed, or resetting a jackpot) and the player may redeem winning tickets without ever using a ticket checker.

FIG. 14 shows a deal database for use in the ticket activation embodiment. For ease of illustration, a single database table is shown that incorporates the conventional deal database, conventional ticket purchase and redemption tracking, as well as the new ticket activation database results. The central accounting system may include some or all of the information in the deal database of FIG. 14 or it may be provided with communications to remotely access one or more other databases that contain information in the deal database. For example, the ticket numbers and ticket results may be stored in a remote deal database, and the local lottery central accounting system database may contain the remaining information. Database 86 described above may be part of the deal database. For ease of reading, FIG. 14 uses "Y" and "N" letters, but an artisan would understand that the databases use "1" and "0" digits that respectively represent the "Y" and "N" letters.

Figure 15:
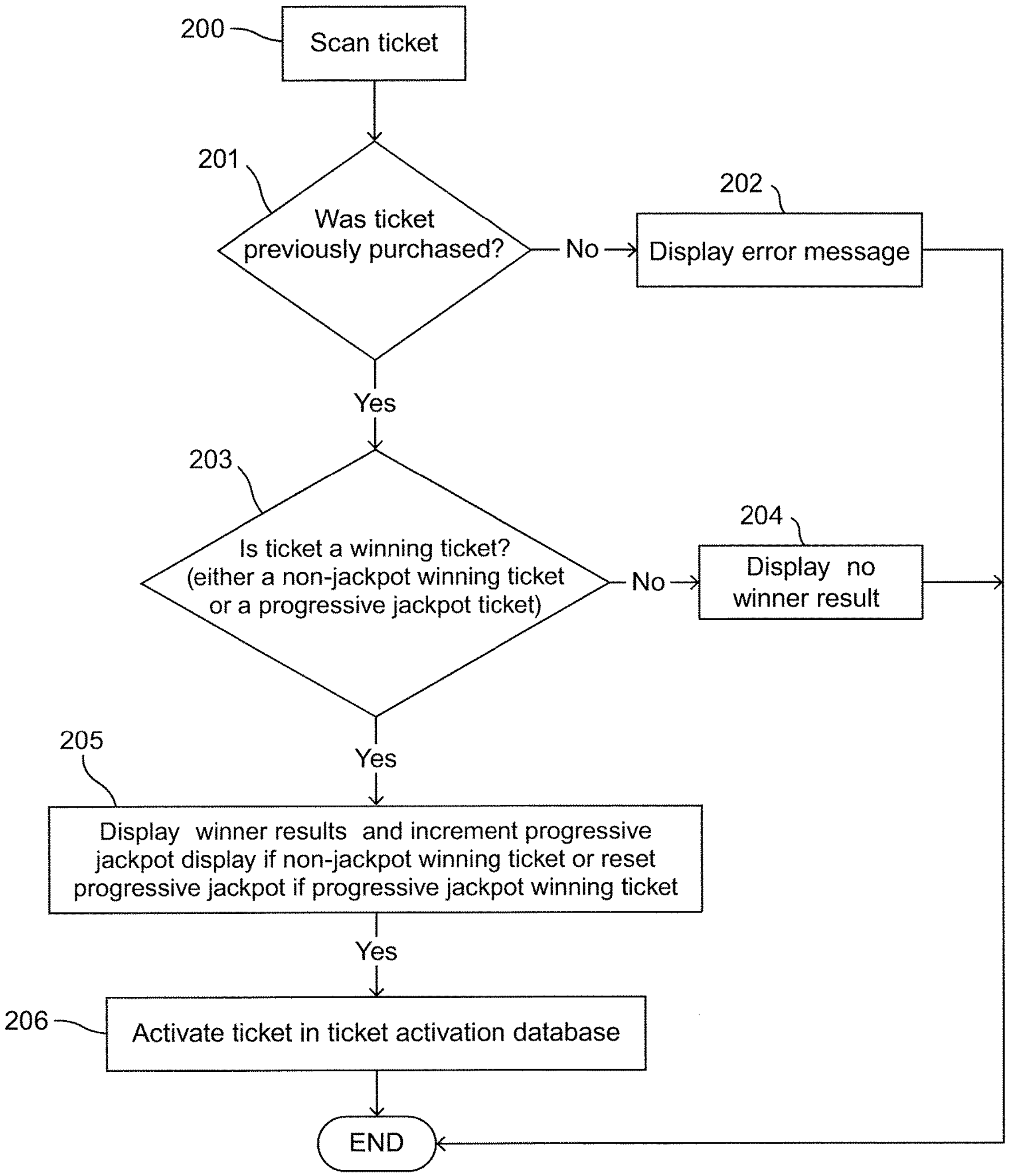
FIG. 15 is a flowchart of a ticket checker/ticket activation process for use in the FIG. 11 embodiment.

FIG. 15 shows one preferred embodiment of a flowchart of a ticket checker/ticket activation process. The steps of the process are as follows:

1. Scan ticket (step 200).

2. Access deal database to determine if the ticket was previously purchased (step 201). If not, an error message is displayed and no further action is taken (step 202).

3. If the ticket was previously purchased, access the deal database to determine if the ticket is a winning ticket, which can be either a non-jackpot winning ticket or a progressive jackpot ticket (step 203). If not, display no winner result (step 204). If so, display winner results and increment progressive jackpot display if non-jackpot winning ticket or reset progressive jackpot if progressive jackpot winning ticket (step 205) and activate the ticket in the ticket activation database (step 206). The winner results include the amount of the non-jackpot winning ticket or the amount of the progressive jackpot winning ticket. Any other ticket checkers in the same system are also immediately updated to display the reset progressive jackpot amount.

Figure 16:
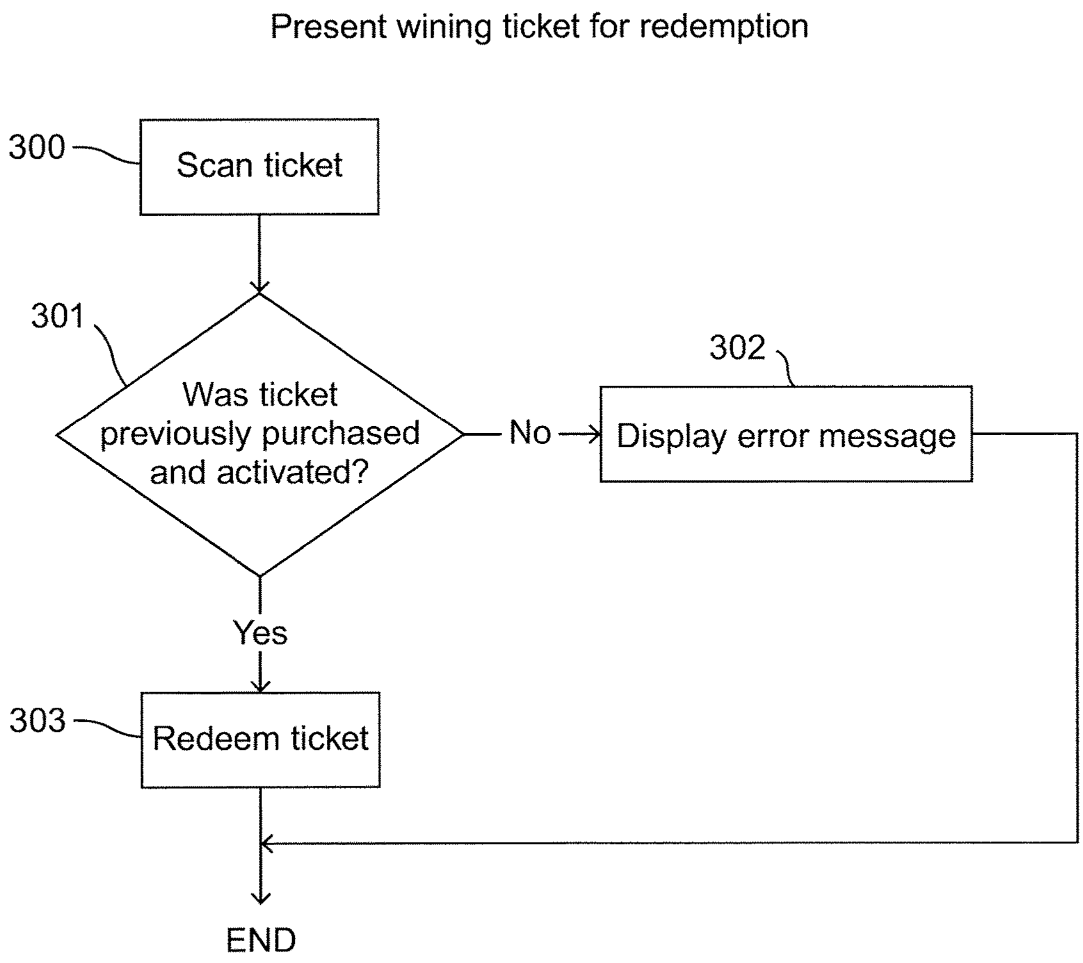
FIG. 16 is a flowchart of a ticket redemption process for use in the FIG. 11 embodiment.

FIG. 16 is a flowchart of a ticket redemption process for use in the ticket activation embodiment. When a winning ticket is presented for redemption, the clerk scans the ticket (step 300). The deal database is then checked to see if the ticket was previously purchased and activated (step 301). The ticket is also checked to ensure that it is a winning ticket, but this step is not shown in FIG. 16. If the ticket was either not previously purchased or not previously activated, an error message is displayed (step 302) and the ticket cannot be redeemed. If the ticket was previously purchased and previously activated, and is further verified as being a winning ticket, the ticket is redeemed (step 303).

Referring to FIG. 14, ticket 1,005 was purchased, activated, and redeemed. However, the progressive jackpot ticket was only purchased, but not yet activated because it was not yet scanned at a ticket checker. If a player attempts to redeem this ticket, redemption will be denied until activation occurs.

This activation embodiment may use the same hardware/software as shown in FIG. 10. As discussed above, conventional ticket checkers do not perform any functions in the redemption process and are merely provided for player convenience to determine if they are holding a winning ticket that should be redeemed.

Ticket activation may differ depending upon the preferences of the gaming operator and the type of game ticket. In one embodiment, referred to herein as "ticket-by-ticket activation," the mere act of scanning the ticket at the kiosk 100 automatically activates all game plays on the ticket, regardless of whether the player requests to see the results of each of the games on the ticket on the kiosk display screen 102. For example, if the $5^{th}$ game play of a 10 game play ticket is a progressive jackpot winner, the $5^{th}$ game play is activated immediately after scanning the ticket.

In an alternative embodiment, referred to herein as "game-by-game activation," the player must actually play through each game of a multi-game ticket (e.g., a lottery ticket that has ten plays per ticket) in order to perform the activation step, and thus be permitted to subsequently redeem the winning games (if any) on the ticket. To facilitate this process, the kiosk display screen 102 may prompt the player to press a button to see the next game results after showing the game results of the first game, and so on. If the ticket is a single play ticket (i.e., one game play per ticket), the player scans the ticket at the kiosk 100 and the ticket results may automatically appear on the kiosk display screen 102 in which case the ticket becomes activated, or the player is prompted to press a button to cause the ticket results to appear. If the player does not press the button to view the ticket results, the ticket remains in an unactivated state. The kiosk 100 may also be programmed to automatically display the results of a ticket having multiple games in an automated sequence without the necessity for the player to press any buttons or even physically remain in front of the kiosk 100. The scanning of ticket may initiate this process. Again, any winning tickets become activated only after the ticket results are displayed.

Another alternative embodiment is a hybrid of the "ticket-by-ticket activation" and "game-by-game activation." In this embodiment, the player is only required to play a subset of the multiple game on a multi-game ticket to cause activation of the entire ticket, including any unplayed games. The kiosk 100 or some other source of information informs the player of the minimum number of games that must be played on a multi-game ticket (e.g., one game of a ten game ticket, three games of a ten game ticket) for complete ticket activation.

The deal database in FIG. 14 depicts an embodiment wherein there is one game play per ticket, and thus the ticket activation database simply tracks whether a ticket has been scanned at a ticket checker. To set a "Y" in the ticket activation database, it may be required that the game results be displayed, and not just that the ticket was scanned, as discussed above. If there are multiple plays per ticket, and the system operates in game-by-game activation mode, the deal database of FIG. 14 is modified to track individual games on a ticket. To set a "Y" in the ticket activation database, the game results for each individual game must be displayed subsequent to ticket scanning, as discussed above. That is, to set a "Y," it is required that the ticket be scanned at the ticket checker, and that the ticket results be displayed at the ticket checker. If there are multiple plays per ticket, and the system operates in ticket-by-ticket activation mode, a "Y" in the ticket activation database is set for all games on the ticket as soon as the ticket is scanned, regardless of whether any game results were requested to be displayed.

Regarding a multi-game ticket that include a progressive jackpot winner, in a game-by-game activation mode, the preferred embodiment is that (i) the progressive jackpot portion of the ticket is activated, (ii) the player is informed that the ticket includes a progressive jackpot winner, and (iii) the progressive display is reset, only after the game play occurs that has the progressive jackpot winner. In an alternative version of game-by-game activation mode, the player is informed upon initial scanning of the multi-game ticket that the ticket includes at least one winning game, but the type and amount of the winning game (non-jackpot fixed amount or progressive jackpot) is not communicated to the player, thereby encouraging the player to play through and activate all of the game plays in the ticket.

Regarding a multi-game ticket that include a progressive jackpot winner, in a ticket-by-ticket activation mode, the preferred embodiment is that (i) the progressive jackpot portion of the ticket is activated, (ii) the player is informed that the ticket includes a progressive jackpot winner, and (iii) the progressive display is reset, immediately after scanning the ticket. This process thwarts subsequent clerk fraud since the player is aware that he or she is in possession of a jackpot winning ticket when it is presented to a clerk for redemption. If the ticket checker does not automatically play through the multiple games as discussed above, the player may do so manually and learn if any of the other game plays are winners and the amounts of the win(s), as well as to be informed of the exact amount of the progressive jackpot win.

Regardless of whether ticket activation is performed ticket-by-ticket or game-by-game, the mere fact that the player has presented the ticket to the ticket checker is a sufficient action to thwart the potential clerk misconduct discussed above, especially if the ticket checkers are located remotely from the clerk dispensing locations.

The ticket checker may be implemented in an application ("app") executing on a mobile device or a local computer. For example, the Washington State lottery provides a "Check Your Ticket" app that allows players to scan their tickets to see if they are winners. However, there is no requirement that a ticket must be checked with the app before it can be redeemed. When implementing the ticket checker embodiment of the present invention, an app of this nature may substitute for the requirement that the player scan the ticket at a physical kiosk before redemption is permitted.

The ticket checker embodiment significantly inhibits clerk fraud that may occur during a clerk-assisted ticket purchasing process. If a clerk learns that a ticket that was just purchased by a player is a jackpot winner, such as by noticing that the jackpot display just decremented, the clerk may surreptitiously swap the winning ticket with a non-winning ticket and set the winning ticket aside for subsequent redemption by themselves or a friend, while handing the player another ticket from the stack, roll or pool of tickets. In another type of clerk fraud, a player hands a previously purchased ticket to a clerk to determine if the ticket is a winner by scanning the ticket at a clerk-accessible ticket checker. If the clerk-accessible ticket checker shows that the ticket is a winner (which can be a jackpot or non-jackpot winner), the clerk may inform the player that the ticket is not a winner and if the player does not ask for the ticket back, the clerk may then keep the ticket for subsequent redemption by themselves or a friend. Alternatively, the clerk could surreptitiously swap the winning ticket with a non-winning ticket and inform the player that the ticket is not a winner.

In this ticket checker embodiment, the progressive jackpot only decrements upon scanning of the ticket at the ticket checker, not upon ticket purchasing. Since the player is informed by the ticket checker that the ticket is a jackpot winner, the player cannot be tricked by a clerk when redeeming the ticket because the player knows that it is a jackpot winner. The same benefit goes for players redeeming non-jackpot winning tickets. In this embodiment, if there is a clerk-accessible ticket checker, this ticket checker is not able to perform ticket activation. That is, ticket activation can only occur at player-accessible self-service ticket checkers.

VI. Multi-Theme Games and Multi-Type Games for Ticket Activating Self-Service Ticket Checker Game tickets typically have a single "game type" expressed via a single "game theme." However, a single game type may be expressed by a plurality of different game themes. For example, Diamond Game Enterprises distributes game machines and software that enable a single game type to be played on two or more game machines which are displayed to the respective players as two or more different game themes. More specifically, one game type can be played using the "Dynamite Diamonds" game theme on one game machine and can also be played on another game machine using the "Hot N Saucy" theme. The same type of preprinted tickets are loaded into both machines. The tickets may be from the same deal and, thus, the pay table for both machines is the same. One example of such a ticket is shown in FIG. 1 of U.S. Pat. No. 8,002,622.

One preferred embodiment extends the concept of a multi-theme game to the display of ticket results at a single ticket checker, wherein the player selects the desired theme from a plurality of choices. In this manner, game play is enhanced because the player can select a desired theme. The ticket checker is preprogrammed to show game play results using a plurality of different themes, and thus no programming changes need to be made to the ticket checker after its initial configuration to provide this functionality. The monetary outcome (i.e., winning ticket amount, if any) for a particular ticket is not affected by the theme selected by the player.

Figure 17:
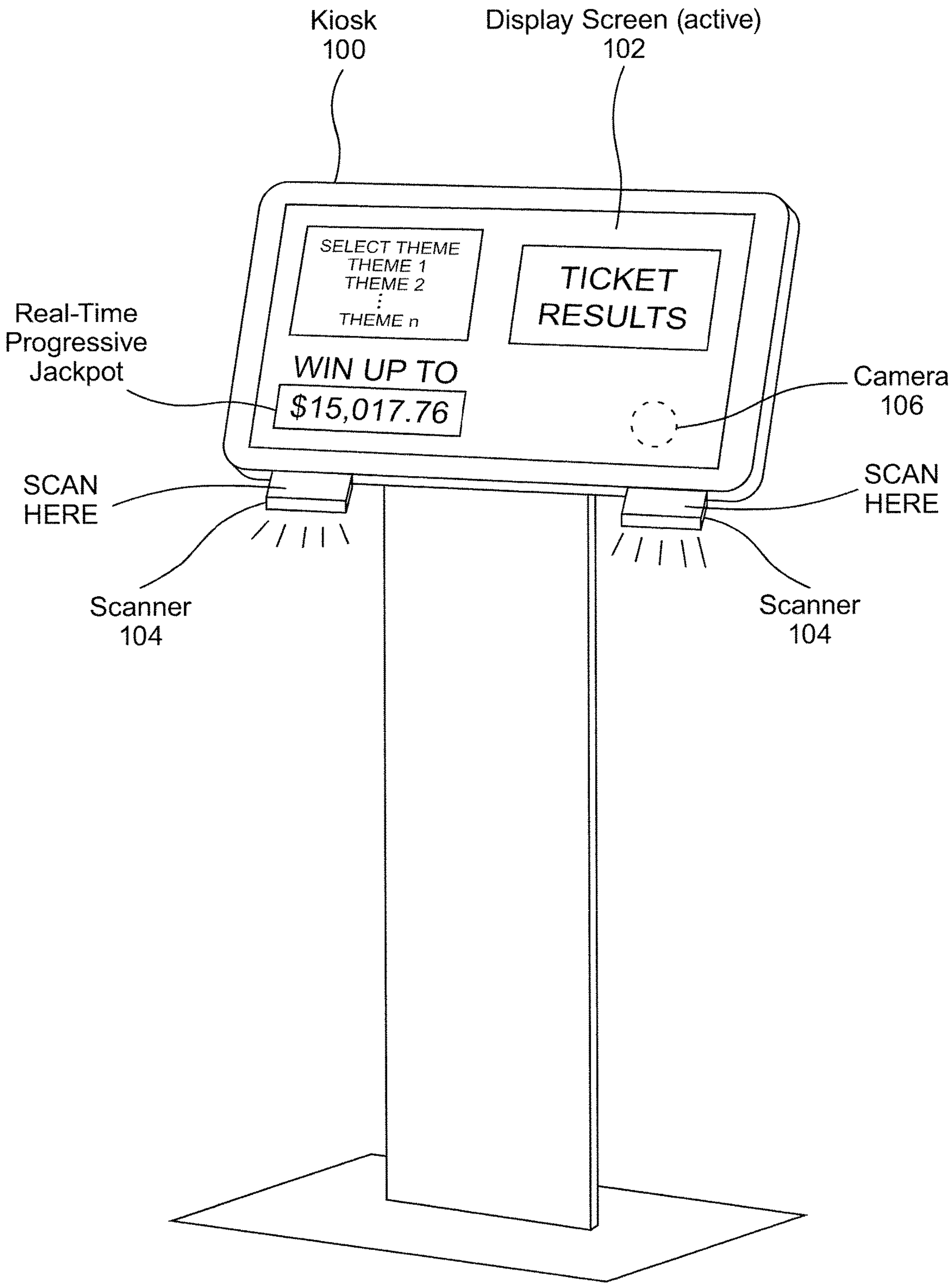
FIG. 17 shows a kiosk for use with a ticket activation feature in accordance with yet another preferred embodiment of the present invention.
Figure 18:
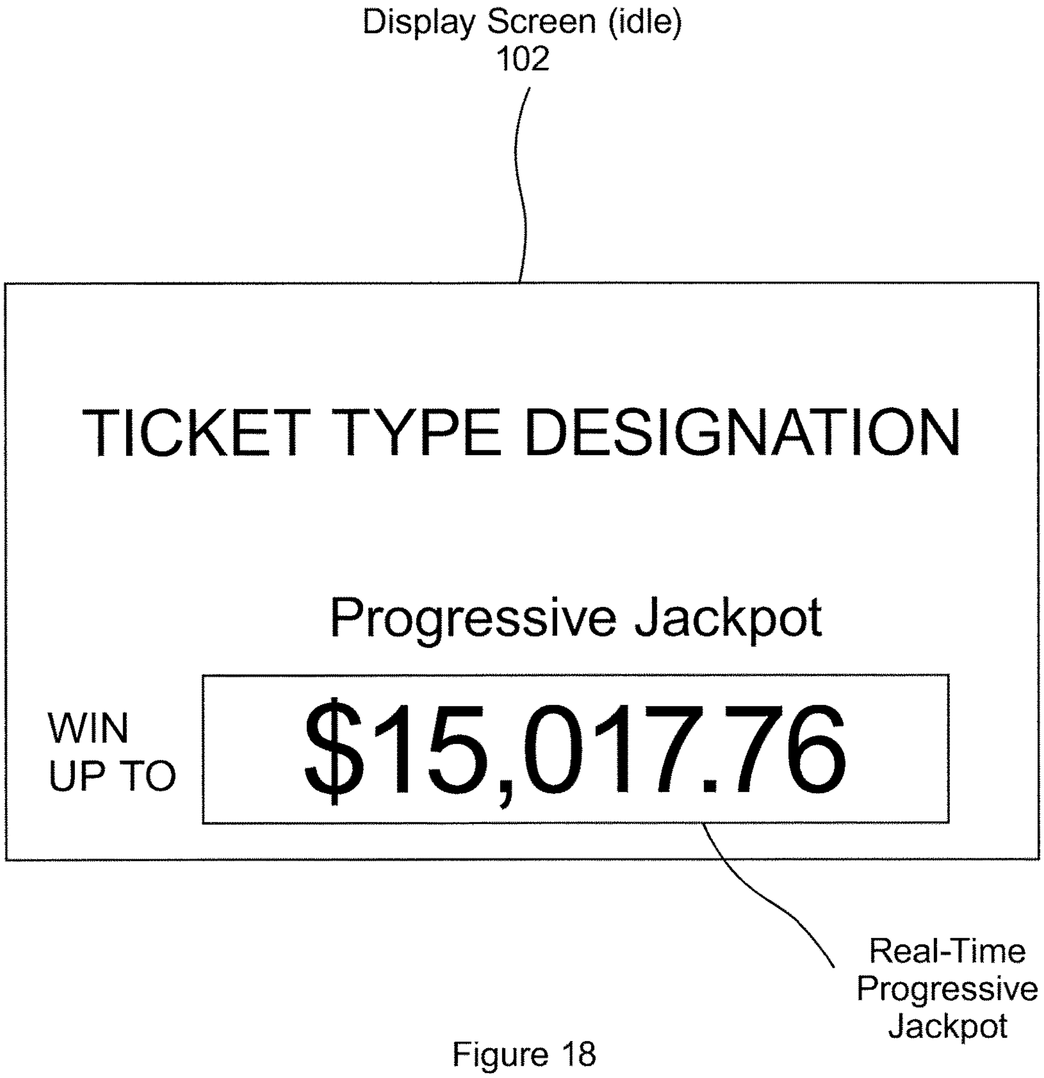
FIG. 18 shows an idle display screen of the kiosk in FIG. 18.
Figure 19A:
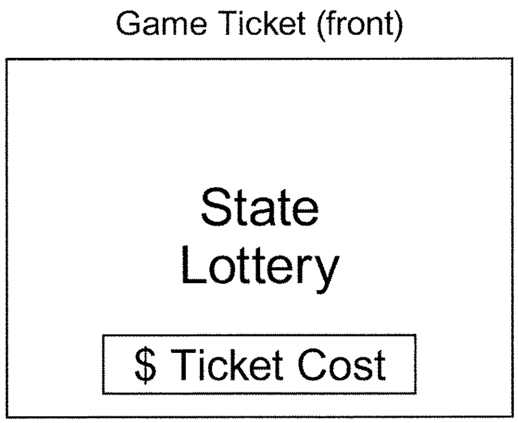
FIGS. 19A-19B show the front and back of a pull-tab lottery ticket for use in the FIG. 17 embodiment.
Figure 19B:
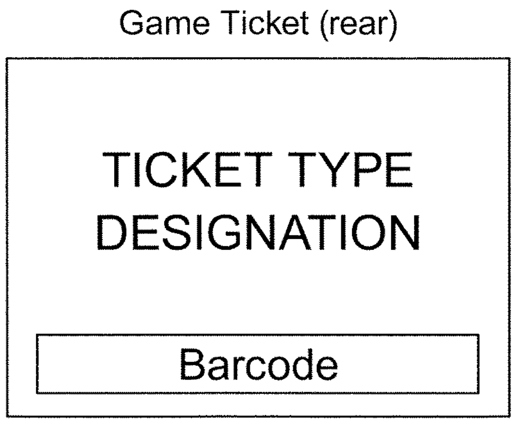

FIGS. 17-19B are similar to FIGS. 11-13B, respectively, except that there is no predefined theme associated with the preprinted tickets. The player must select a desired game theme before the ticket results are displayed, as shown in FIG. 17. The ticket is printed with a non-game theme specific ticket type designation, as shown in FIG. 19B.

In yet another embodiment, different game types may be selected based on the monetary outcome of the scanned ticket. After scanning the ticket, the ticket checker would determine the game types that could generate the monetary outcome of the ticket from each game type's play results and present the applicable game types to the player. Once a game type is selected, the player may optionally be provided with a choice to select a particular theme for the chosen game type. Alternatively, a preselected game theme may be used for each player-selected game type to streamline the ticket activation process performed at the ticket checker. In this manner, game play is enhanced because a player may select a desired game type. The ticket checker is preprogrammed to show game play results using a plurality of different game types, and thus no programming changes need to be made to the ticket checker after its initial configuration to provide this functionality.

Examples of different game types include reel-based games (e.g., slot machine), card games (e.g., draw poker), simulated lottery ticket (e.g., representation of a scratch ticket) and bingo. Since the same preprinted game ticket is used for all of the game types, there is no need to change the installed software on the ticket checker after its initial configuration to translate a given ticket's monetary outcome into appropriate game results for the chosen game type. As discussed above, the ticket checker is preprogrammed to present game results in multiple game type formats.

Figure 20:
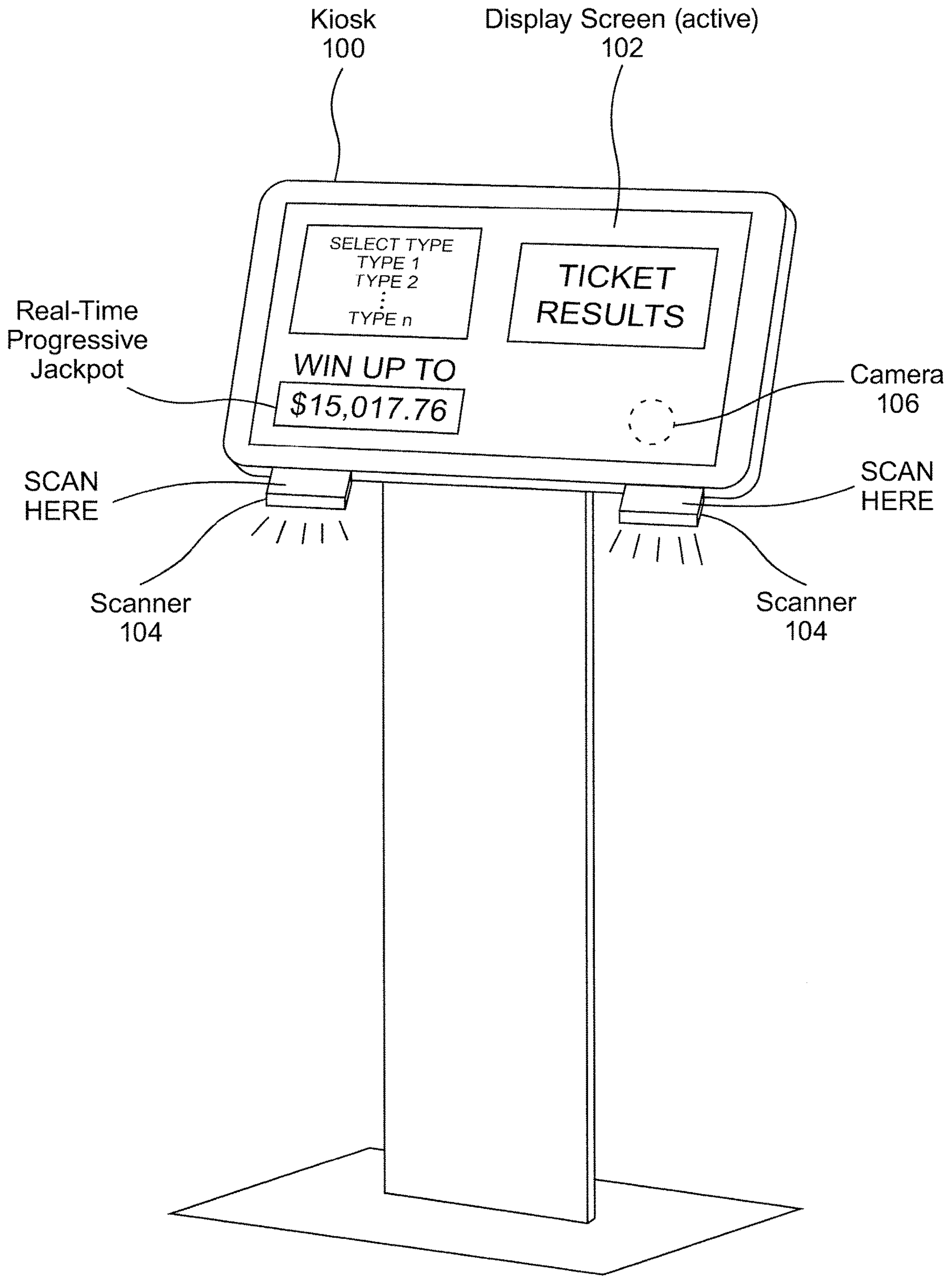
FIG. 20 shows a kiosk for use with a ticket activation feature in accordance with yet another preferred embodiment of the present invention.
Figure 21:
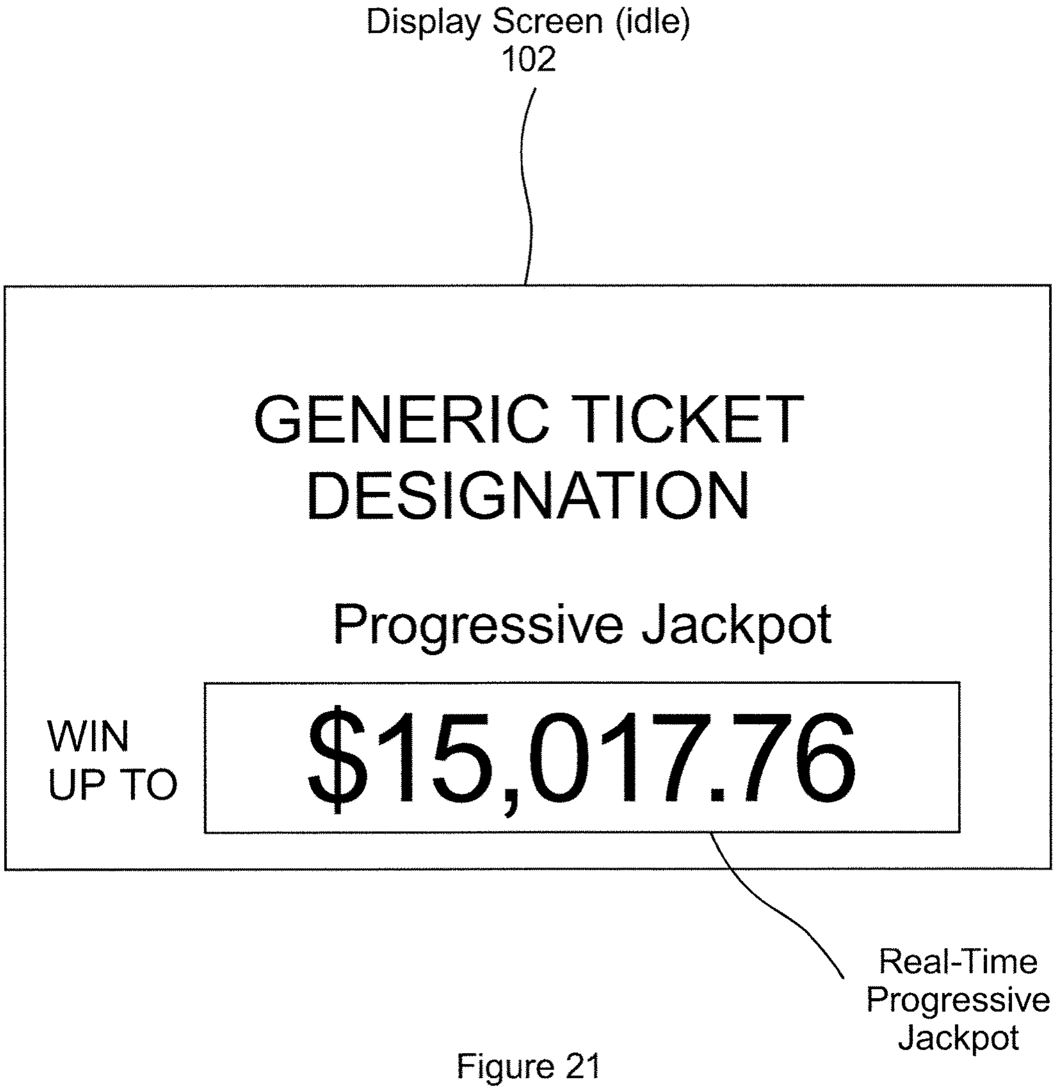
FIG. 21 shows an idle display screen of the kiosk in FIG. 20.
Figure 22A:
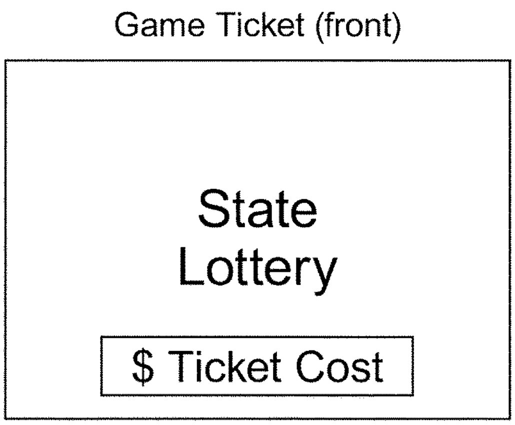
FIGS. 22A-22B show the front and back of a pull-tab lottery ticket for use in the FIG. 17 embodiment.
Figure 22B:
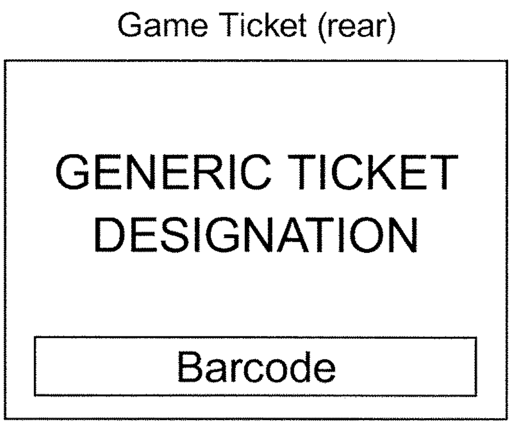

FIGS. 20-22B are similar to FIGS. 11-13B, respectively, except that there is no predefined game type or theme to the preprinted tickets. The player must select a desired game type before the ticket results are displayed, as shown in FIG. 20. The ticket is printed with a generic ticket designation, as shown in FIG. 22, because there is no predetermined game type or game theme.

FIGS. 23A and 23B show one example wherein two different game types may be played for a ticket that has five game plays and a face value of $5.00. The ticket has the same monetary outcome, regardless of the game type selected by the player. (The monetary outcome is unknown to the player until the ticket is scanned at a ticket checker and activated as described above.) Here, the monetary outcome is $25.00. Each game type has a set of results for each game play. The game software selects a subset of play results that achieve the applicable monetary outcome based on the ticket results. In FIG. 23A, the player has selected a lottery pull-tab game type having the theme of "Dynamite Diamonds." (As noted above, the theme may be player-selected or preselected.) FIG. 23A shows the play result and monetary outcome for each of the five game plays which are experienced at the ticket checker. Thus, FIG. 23A shows the subset of play results selected by the game software that achieves the monetary outcome on the applicable ticket for the game type selected by the player.

In FIG. 23B, the player has selected a Class II Bingo game having the theme of "Press It Up Poker." FIG. 23B shows the play result and monetary outcome for each of the five game plays which are experienced at the ticket checker. Thus, FIG. 23B also shows the subset of play results selected by the game software that achieves the monetary outcome on the applicable ticket for the game type selected by the player. As shown in FIGS. 23A and 23B, the monetary outcome of both game types is $25.00.

The flowcharts for these embodiments (not shown) are similar to the flowcharts of FIGS. 15 and 16, except that before or after the first step of scanning a ticket, the player must select the desired game theme and/or type.

Conventional preprinted game tickets which have a predefined monetary outcome, such as instant game lottery tickets or pull-tab tickets, are typically preprinted with a specific game type and game theme, and thus there is no ability for the player to alter the game type or game theme of the ticket, either before or after purchase. As discussed above, one type of preprinted game ticket shown in FIG. 1 of U.S. Pat. No. 8,002,622 is preprinted with a designated game type (e.g., lottery pull-tab game type), but not with a designated theme. These game tickets may be loaded into two different game machines that have different game themes. In such game machines, the player is provided with the physical ticket only after game play based on the theme of the game machine selected by the player.

Figure 24:
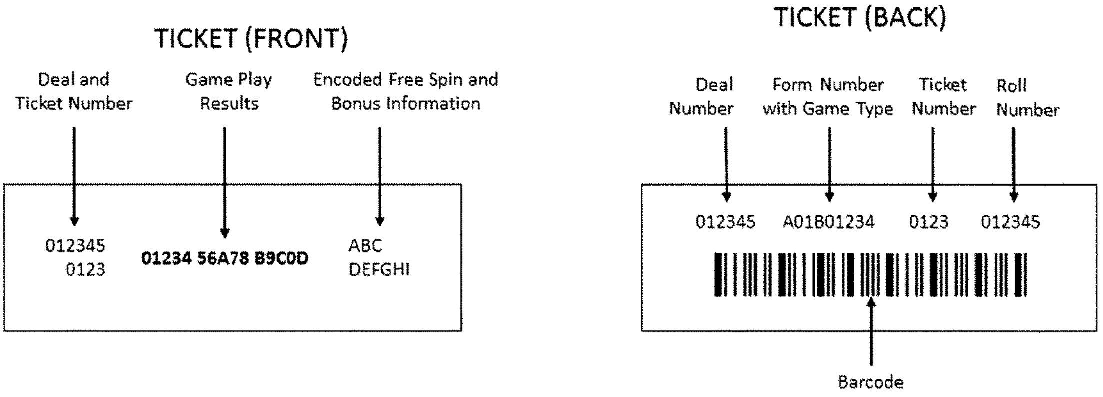
Figure 24 (PRIOR ART)
FIG. 24 shows a prior art game ticket.

FIG. 24 shows another example of a prior art game ticket used in Diamond Game's LT-3 ticket dispensers. In such tickets, a game type code is indicated in the ticket's form number. Here, the game type code is represented as "A0."

Unlike any of these conventional gaming processes for preprinted tickets, the ticket activating self-service ticket checker described herein provides a new paradigm for preprinted game tickets wherein a ticket having no predesignated game type and/or game theme is purchased and physically given to a player, who can then select the game type and/or game theme at a single, ticket activating ticket checker machine which is preprogrammed to provide game results in a plurality of different game types and/or game themes.

The ticket checker described herein may handle game tickets that have a predetermined game type and game theme, as well as generic game tickets that do not have a predetermined game type and/or game theme. Thus, if a player scans a ticket that has a predetermined game type and game theme (e.g., a lottery pull tab game type with the "Dynamite Diamonds" theme), the ticket scanner will automatically present the results in the expected manner for the applicable game type and game theme. However, if a player scans a generic ticket, the player will be initially prompted with an option to select a game type and/or game theme before the play results are displayed. In such an embodiment, the ticket checker performs the following initial steps after the player scans the ticket's barcode:

1. Identify whether the ticket is a generic ticket or not.

2a. If the ticket is not a generic ticket, identify the game type and game theme based on information contained within the barcode or otherwise derived from that information (i.e., the game type and game theme may be explicitly coded into the barcode, or other information such as the deal and/or ticket number which is coded into the barcode may be associated with a specific game theme and/or game type); OR 2b. If the ticket is a generic ticket, prompt the player to select a game type and/or game theme, as discussed above. A generic ticket may be identified by either the absence of information in the barcode indicating a specific game theme or game type, or other information coded into the barcode, such as the deal and/or ticket number, may be associated with a generic ticket (e.g., all tickets from a particular deal or within a certain ticket number range are previously designated as being generic tickets when they are printed).

3. Once the appropriate game theme and game type is identified, the appropriate software is invoked to present the play results at the ticket checker.

If no generic tickets are used in the system (i.e., all tickets issued by the system have a predetermined game type and game theme), then the initial step of determining whether or not a scanned ticket is a generic ticket is skipped and the system logic only functions to identify the predetermined game type and game theme, so as to render the appropriate display.

VII. Additional Considerations

Instant game tickets, such as lottery tickets and pull-tab tickets, which are created from deals come in a large variety of types and form factors. The scope of the present invention includes all such types and form factors of instant game tickets.

The embodiments above use an MLPIT deal generated with "X" number of tickets and "Y" number of progressive winners. When the MLPIT deal is completed, various options are available for handling any amounts left in the progressive jackpot, including the following options:

i. If no new MLPIT deal is generated and put into play, any amounts left in the progressive jackpot are handled at the discretion of the applicable regulator or lottery administrator.

ii. If a new MLPIT deal is generated and put into play, any amounts left in the progressive jackpot are rolled over to the new MLPIT deal.

If all of the jackpot tickets in the current deal have been dispensed, various options are available regarding funding of the progressive jackpot, including the following options:

i. Stop funding the progressive jackpot for subsequently purchased tickets and suppress all displays of the progressive jackpot amount so as to avoid communicating to players that a progressive jackpot is currently available to be won.

ii. Continue funding the progressive jackpot for subsequently purchased tickets and continue displaying the progressive jackpot. This option may be used when the progressive jackpot rolls over to a new deal, as described above.

As discussed above, in one embodiment wherein the jackpot resets upon customer redemption of a progressive jackpot winning ticket, a predetermined time period (e.g., 90 days) is preferably designated for redemption of a progressive jackpot winning ticket, so that a customer cannot intentionally and repeatedly delay redeeming such a ticket until the progressive jackpot is more favorable. However, this embodiment may also use conventional lottery rules for unclaimed prizes. For example, the Rhode Island state lottery requires that all lottery prizes for instant game prizes must be claimed within one year of the game end date. In the Michigan state lottery, some instant game tickets print the date by which all prizes must be claimed directly on the ticket. By using either of these conventional processes, it is not necessary to track the date on which the tickets were sold because the sale date has no direct bearing on the ticket expiration date. This simplifies the ticket sales process because no scanning or recording of ticket identifying indicia on individually dispensed tickets is required.

If either of these conventional processes were used in the progressive jackpot of the present invention and the progressive jackpot was funded by a portion of each ticket sale, the recordation of a ticket sale by a clerk, such as by ringing up the ticket purchase using a generic SKU or the like for a ticket, as is known in the art, becomes the triggering event for funding the progressive jackpot.

One aspect of relying upon these conventional rule-based redemption expiration deadlines and not scanning or recording dispensed tickets is that if the "stop funding" option described above is desired to be used, the suppression of the displays will be triggered based on redemption activity, not dispensing activity, because the system does not definitively know when all of the progressive jackpot tickets for a deal were dispensed.

The present invention may be implemented with any combination of hardware and software. If implemented as a computer-implemented apparatus, the present invention is implemented using means for performing all of the steps and functions described above.

When implemented in software, the software code for the servers can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein for the servers may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer(s) may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface include keyboards, optical scanners, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A system for resetting a progressive jackpot and its associated progressive jackpot display for a game defined by a plurality of tickets that are preprinted with game content and which are associated with a deal of tickets that include (i) at least some predetermined non-jackpot winning tickets, and (ii) one or more progressive jackpot tickets, wherein the tickets are dispensed at a plurality of different remote locations, and wherein the progressive jackpot is the same progressive jackpot for each of the plurality of different remote locations, the system comprising:

(a) a plurality of progressive jackpot displays located at one or more of the plurality of different remote locations; and (b) a server that maintains the progressive jackpot and controls the progressive jackpot displays so as to reflect a current progressive jackpot amount, the server configured to detect when a progressive jackpot ticket is dispensed at any of the plurality of different remote locations, and upon such detection configured to:

(i) immediately reset the progressive jackpot to a seed amount, and (ii) reset each of the progressive jackpot displays to reflect the current progressive jackpot amount, wherein the resetting is intentionally delayed at one or more of the progressive jackpot displays by a predefined time period of multiple seconds to multiple minutes.

2. The system of claim 1 further comprising:

(c) a plurality of ticket dispensing machines, wherein there is at least one ticket dispensing machine at each remote location, each of the ticket dispensing machines including an internal scanner for detecting ticket identifying indicia as the ticket is being dispensed, the ticket dispensing machines automatically communicating the ticket identifying indicia to the server, wherein the server is further configured to use the ticket identifying indicia to detect whether the tickets are non-jackpot winning tickets or progressive jackpot tickets.

3. The system of claim 2 wherein the ticket dispensing machines are clerk-operated ticket dispensers.

4. The system of claim 1 wherein the server further receives data regarding which remote location the progressive jackpot tickets are dispensed from, and wherein the resetting is intentionally delayed only on the progressive jackpot displays at the remote location that the last progressive jackpot ticket was dispensed from, the remaining progressive jackpot displays being immediately reset to reflect the current progressive jackpot amount upon detecting that a progressive jackpot ticket was dispensed at any of the plurality of different remote locations.

5. The system of claim 1 wherein the resetting is intentionally delayed at all of the progressive jackpot displays.

6. The system of claim 1 further comprising:

(c) sets of initially undispensed tickets at each of the remote locations arranged in one of a stack, roll or pool of tickets, wherein the sets of initially undispensed tickets are manually dispensed by clerks who dispense the tickets by manually retrieving the tickets from the stack, roll or pool of tickets; and (d) a scanner for communicating ticket identifying indicia to the server upon scanning of the ticket identifying indicia by the clerk for dispensed tickets, wherein the server is further configured to use the ticket identifying indicia to detect whether the tickets are non-jackpot winning tickets or jackpot tickets.

7. The system of claim 1 wherein the progressive jackpot is funded by a portion of each ticket sale.

8. The system of claim 1 wherein the progressive jackpot is funded by a portion of each ticket sale, the system further comprising:

(c) a database in electronic communication with the server that maintains records of all progressive jackpot tickets in the deal and all progressive jackpot tickets that were dispensed, wherein the server is further configured to stop funding the progressive jackpot upon detection that all progressive jackpot tickets in the deal were dispensed and to suppress all progressive jackpot displays, thereby indicating that no progressive jackpot is currently available.

9. The system of claim 1 wherein at least one progressive jackpot display is located at each of the plurality of different remote locations.

10. A system for resetting a progressive jackpot for a game defined by a plurality of tickets that are preprinted with game content and which are associated with a deal of tickets that include (i) at least some predetermined non-jackpot winning tickets, and (ii) one or more progressive jackpot tickets, wherein the tickets are dispensed at a plurality of different remote locations, and wherein the progressive jackpot is the same progressive jackpot for each of the plurality of different remote locations, the system comprising:

(a) an electronic memory that maintains a progressive jackpot, and (b) a server in communication with the electronic memory configured to:

(i) detect when a previously unredeemed progressive jackpot ticket is presented for redemption at any of the plurality of different remote locations, (ii) electronically approve the redemption of the presented progressive jackpot ticket, and (iii) immediately reset the progressive jackpot in the electronic memory to a seed amount upon approval of redemption, wherein the progressive jackpot is not reset upon dispensing of progressive jackpot tickets.

11. The system of claim 10 further comprising:

(c) a database that is in electronic communication with the server and maintains records of progressive jackpot tickets that were dispensed, the database including a timestamp of when each of the progressive jackpot tickets was dispensed, wherein the server is further configured to:

(iv) detect from the timestamp of the presented progressive jackpot ticket whether a predetermined time period has been exceeded between the time of dispensing and the time of presentation for redemption, and (v) electronically approve the redemption of the presented progressive jackpot ticket upon detecting that the predetermined time period has not been exceeded and electronically disapprove the redemption of the presented progressive jackpot ticket upon detecting that the predetermined time period has been exceeded.

12. The system of claim 11 wherein the predetermined time period is about 90 days.

13. The system of claim 10 wherein the progressive jackpot is incremented by a portion of the value of one or more winning tickets that are redeemed.

14. The system of claim 13 wherein the progressive jackpot is incremented only by a portion of the value of one or more winning tickets that are redeemed.

15. A system for incrementing a progressive jackpot for a game defined by a plurality of tickets that are preprinted with game content and which are associated with a deal of tickets that include (i) at least some predetermined non-jackpot winning tickets, and (ii) one or more progressive jackpot tickets, wherein the tickets are dispensed at a plurality of different remote locations, and wherein the progressive jackpot is the same progressive jackpot for each of the plurality of different remote locations, the system comprising:

(a) an electronic memory that maintains a progressive jackpot, and (b) a server in communication with the electronic memory configured to:

(i) detect when a previously unredeemed non-jackpot winning ticket is presented for redemption at any of the plurality of different remote locations, (ii) electronically approve the redemption of the presented non-jackpot winning ticket, and (iii) increment the progressive jackpot in the electronic memory by a portion of the value of the non-jackpot winning ticket upon approval of redemption of the presented non-jackpot winning ticket.

16. The system of claim 15 wherein the server is further configured to:

(iv) increment the progressive jackpot by a portion of the value of dispensed tickets upon dispensing of the tickets.

17. The system of claim 15 wherein the progressive jackpot is incremented only by a portion of the value of a non-jackpot winning ticket that is being redeemed.

* * * * *